US008869017B2

(12) United States Patent
Piantino et al.

(10) Patent No.: US 8,869,017 B2
(45) Date of Patent: Oct. 21, 2014

(54) AGGREGATING SOCIAL NETWORKING SYSTEM USER INFORMATION FOR DISPLAY VIA STORIES

(75) Inventors: Serkan Piantino, New York, NY (US); Daniel Klatzko Gibson, Palo Alto, CA (US); Jeff Huang, Mountain View, CA (US); Paul M. McDonald, Palo Alto, CA (US); Arun Vijayvergiya, San Francisco, CA (US); Steven Young, Mountain View, CA (US); Raylene Kay Yung, San Francisco, CA (US); Mark E. Zuckerberg, Palo Alto, CA (US)

(73) Assignee: Facebook, Inc, Menlo Park, CA (US)

( * ) Notice: Subject to any disclaimer, the term of this patent is extended or adjusted under 35 U.S.C. 154(b) by 257 days.

(21) Appl. No.: 13/239,354

(22) Filed: Sep. 21, 2011

(65) Prior Publication Data
US 2013/0073970 A1    Mar. 21, 2013

(51) Int. Cl.
*G06F 15/173* (2006.01)
*G06Q 50/00* (2012.01)

(52) U.S. Cl.
CPC .................................... *G06Q 50/01* (2013.01)
USPC ............ 715/203; 715/201; 715/230; 715/233

(58) Field of Classification Search
CPC . G06F 17/211; G06F 17/2264; G06F 17/241; G06F 17/30044; G06F 17/30064
USPC ......... 715/200, 201, 203, 204, 230, 232, 233, 715/273, 277
See application file for complete search history.

(56) References Cited

U.S. PATENT DOCUMENTS

| | | | |
|---|---|---|---|
| 6,608,615 B1 | 8/2003 | Martins | |
| 6,996,782 B2 | 2/2006 | Parker et al. | |
| 7,669,123 B2 | 2/2010 | Zuckerberg et al. | |
| 7,725,492 B2 * | 5/2010 | Sittig et al. | 707/784 |
| 7,797,256 B2 * | 9/2010 | Zuckerberg et al. | 705/319 |
| 7,925,991 B2 | 4/2011 | Ruckart et al. | |
| 8,099,433 B2 * | 1/2012 | Sittig et al. | 707/784 |
| 8,306,922 B1 * | 11/2012 | Kunal et al. | 705/319 |
| 8,311,950 B1 * | 11/2012 | Kunal et al. | 705/319 |
| 8,356,248 B1 | 1/2013 | Killalea | |
| 8,533,175 B2 | 9/2013 | Roswell | |

(Continued)

OTHER PUBLICATIONS

U.S. Appl. No. 12/978,265, filed Dec. 23, 2010 (copy not enclosed).

(Continued)

*Primary Examiner* — Stephen Hong
*Assistant Examiner* — Gregory J Vaughn
(74) *Attorney, Agent, or Firm* — Fenwick & West LLP

(57) ABSTRACT

The invention provides a display interface in a social networking system that enables the presentation of information related to a user in a timeline or map view. The system accesses information about a user of a social networking system, including both data about the user and social network activities related to the user. The system then selects one or more of these pieces of data and/or activities from a certain time period and gathers them into timeline units based on their relatedness and their relevance to users. These timeline units are ranked by relevance to the user, and are used to generate a timeline or map view for the user containing visual representations of the timeline units organized by location or time. The timeline or map view is then provided to other users of the social networking system that wish to view information about the user.

25 Claims, 14 Drawing Sheets

(56) References Cited

U.S. PATENT DOCUMENTS

| | | |
|---|---|---|
| 8,543,586 B2 | 9/2013 | Glachant et al. |
| 8,612,517 B1 | 12/2013 | Yadid et al. |
| 2004/0155903 A1 | 8/2004 | Schneeberg |
| 2006/0106764 A1 | 5/2006 | Girgensohn et al. |
| 2006/0168510 A1 | 7/2006 | Bryar et al. |
| 2007/0011150 A1 | 1/2007 | Frank |
| 2007/0150234 A1 | 6/2007 | Wicks |
| 2007/0162322 A1 | 7/2007 | Shahine et al. |
| 2007/0192299 A1 | 8/2007 | Zuckerberg et al. |
| 2007/0214141 A1* | 9/2007 | Sittig et al. ............ 707/7 |
| 2008/0033739 A1* | 2/2008 | Zuckerberg et al. ........ 705/1 |
| 2008/0040370 A1 | 2/2008 | Bosworth et al. |
| 2008/0040474 A1 | 2/2008 | Zuckerberg et al. |
| 2008/0189292 A1* | 8/2008 | Stremel et al. ............ 707/10 |
| 2008/0294663 A1* | 11/2008 | Heinley et al. ............ 707/100 |
| 2009/0031245 A1 | 1/2009 | Brezina et al. |
| 2009/0112467 A1 | 4/2009 | Jiang et al. |
| 2009/0132953 A1 | 5/2009 | Reed et al. |
| 2009/0169060 A1 | 7/2009 | Faenger et al. |
| 2009/0249223 A1 | 10/2009 | Barsook et al. |
| 2009/0265359 A1 | 10/2009 | Barsook et al. |
| 2010/0145936 A1 | 6/2010 | Grinstein et al. |
| 2010/0198880 A1 | 8/2010 | Petersen |
| 2010/0199192 A1* | 8/2010 | Sittig et al. .................. 715/751 |
| 2010/0332330 A1* | 12/2010 | Goel et al. ................. 705/14.66 |
| 2011/0021250 A1 | 1/2011 | Ickman et al. |
| 2011/0029560 A1* | 2/2011 | Stremel et al. ............. 707/770 |
| 2011/0029638 A1* | 2/2011 | Stremel et al. ............. 709/217 |
| 2011/0066606 A1 | 3/2011 | Fox et al. |
| 2011/0066941 A1* | 3/2011 | Chipchase et al. ........... 715/716 |
| 2011/0078598 A1 | 3/2011 | Barak |
| 2012/0011103 A1* | 1/2012 | Joo et al. ................. 707/687 |
| 2012/0108274 A1* | 5/2012 | Acebo Ruiz et al. ......... 455/466 |
| 2012/0124508 A1 | 5/2012 | Morin et al. |
| 2012/0137224 A1 | 5/2012 | Carlsen et al. |
| 2012/0151322 A1 | 6/2012 | Lindsay et al. |
| 2012/0158935 A1* | 6/2012 | Kishimoto et al. ........... 709/223 |
| 2012/0166971 A1 | 6/2012 | Sachson et al. |
| 2012/0190387 A1 | 7/2012 | Redstone et al. |
| 2012/0254225 A1* | 10/2012 | Carter et al. .............. 707/769 |
| 2013/0046771 A1 | 2/2013 | Moitra et al. |
| 2013/0073995 A1 | 3/2013 | Piantino et al. |

OTHER PUBLICATIONS

U.S. Appl. No. 13/087,672, filed Apr. 15, 2011 (copy not enclosed).

\* cited by examiner

| | | | 274 |
|---|---|---|---|
| Nair R › Activity Log | 🔒 Private log of your activity | | Filter ▾ |

▾ 2011 Jan - Feb - Mar - Apr - May - Jun - Jul - Aug - Sep
Today

| | | | |
|---|---|---|---|
| 9:55am | Nair and Paul H are now friends. | | ☐ All |
| 9:00am | Nair commented on her own post on Bob D's wall. | "Douglas H and I want to get some beers in Soma" | ⊟ Photos<br>⊟ Events<br>⊠ Likes<br>⊠ Places |
| 9:00am | Nair wrote on Bob D's wall. | "What are you up to?!!" | ⊟ Dogbook<br>⊠ Groupon<br>○ Spotify<br>⊡ Presence |
| | 3 similar stories | | |
| 8:50am | Nair added a new photo to the album mobile Uploads. | Mobile Uploads<br>"Oh hai, are you really going to pick up that backpack and leave?" | 275 |
| 9:06am | Nair added a new photo to the album Mobile Uploads. | Mobile Uploads<br>"Sunroof view" | ✦ Feature on Timeline<br>✓ ● Allow on Timeline<br>○ Hide from Timeline |
| 7:37am | Nair wrote on David Grey's wall. | "Happy Birthday!" | ⊕ Public<br>✓ ♣ Friends<br>✱ Custom |
| 6:00am | Nair was at Pilates Club. | | ☐ Facebook |
| September 11th | | | ♣ Close Friends<br>♣ Default All<br>♣ Family |
| 11:48pm | Nair commented on Marry R's photo. | "Awesome picture of Amy C. I love this haircut. So mod." | See all lists... |
| | More Activity | | Return |
| | | | Change Date... |

▸ 2010 Jan - Feb - Mar - Apr - May - Jun - Jul - Aug - Sep - Oct - Nov - Dec

▸ 2009 Jan - Feb - Mar - Apr - May - Jun - Jul - Aug - Sep - Oct - Nov - Dec

FIG. 2G

AGGREGATING SOCIAL NETWORKING SYSTEM USER INFORMATION FOR DISPLAY VIA STORIES

BACKGROUND

This invention relates generally to social networking and, in particular, to displaying information about users of a social networking system.

Social networking systems capture large volumes of information from various sources. Information stored by the social networking system will often, if not always, have a time associated with it. Typically, information about a user of a social networking system is displayed through a profile web page that is divided into sections, each section containing different types of information pertaining to the user. For example, a user's profile page may have separate sections for educational information, interests, status updates, and hobbies, as well as a section containing thumbnails of photos of the user, and links to the user's friends.

The shortcoming of this sort of display is that as the social networking system accumulates more and more information about the user over time, it becomes difficult to locate older information about the user, since the user's profile page has a limited amount of display space, and the system is constantly obtaining new information as the user adds new photos, friends, status updates, etc. Although viewers of a user's profile page are often interested in the newest information about a user, this will not always be the case. For example, old classmates of a user may wish to browse information about the user from a shared time together at university that occurred many years earlier.

Furthermore, since there is a large variety of information being captured in large volumes by the social networking system, there is a need for ways to aggregate information in compact yet informative structures, so that users can efficiently consume such information. In addition, information from a certain time period often has a relationship to other types of information from the same time period, which makes it desirable to associate or display such information together. For example, it may be interesting for viewers to see photos of a user from his college days in conjunction with that user's status updates from the same period. However, if the user's profile page displays information segmented by information type, then viewers wishing to view the user's historical information are forced to manually search for that information in each information section individually. This makes it difficult, if not impossible, to view different types of information related to a particular time period concurrently. In addition, if a user has a large amount of information in a particular time period, it would be desirable for there to be some way to select the most relevant information for presentation to viewers.

SUMMARY

Embodiments of the invention provide a display interface in a social networking system that enables the presentation of information related to a user in a chronological timeline, newsfeed, map view or other display. A ranking method may be used to highlight the most relevant information in the timeline.

In an embodiment of the invention, the system accesses information about a user of a social networking system, including both data about the user, such as date of birth, graduation date, interests, employers, photos, videos, etc., as well as social network activities related to the user, such as comments, status updates, blog posts, etc. The system then selects one or more of these pieces of data and/or activities from a certain time period and gathers them into stories based on their relatedness and their relevance to users. The stories are customized aggregations of information configured for presentation of information in a particular data view. For example, data and/or activities from a time period may be gathered into a story type called a timeline unit based on being of a similar type (e.g., several photos from a time period could be gathered into one photo timeline unit). This timeline unit may be used to present information about the user on a timeline. In another example, data and/or activities associated with a location may be gathered together into a story based on being associated with that location, and this story may be used to present information about the user on a map.

Once the system has created these stories it can rank these stories based on their relevance to users, and can then construct various views on the user's information comprising visual representations of the top-ranked stories. These information views can then be provided to other users of the social networking system that wish to view information about the first user.

BRIEF DESCRIPTION OF THE DRAWINGS

FIGS. 2A, 2B, 2C, 2D, 2E, 2F, 2G, and 2H illustrate embodiments of the timeline interface in various states.

FIG. 1 and the other figures use like reference numerals to identify like elements. A letter after a reference numeral, such as "130A," indicates that the text refers specifically to the element having that particular reference numeral. A reference numeral in the text without a following letter, such as "130," refers to any or all of the elements in the figures bearing that reference numeral (e.g. "130" in the text refers to reference numerals "130A" and/or "130B" in the figures).

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

A social networking system generates timeline units based upon data in the social networking system that is associated with users, and generates displayable representations of selected timeline units, which are dispatched to client devices for display to viewing users in a timeline interface. The selection of timeline units for display in the timeline interface may be based upon a ranking of candidate timeline units, where a machine-learned model may perform the ranking.

System Overview

Figure 1:
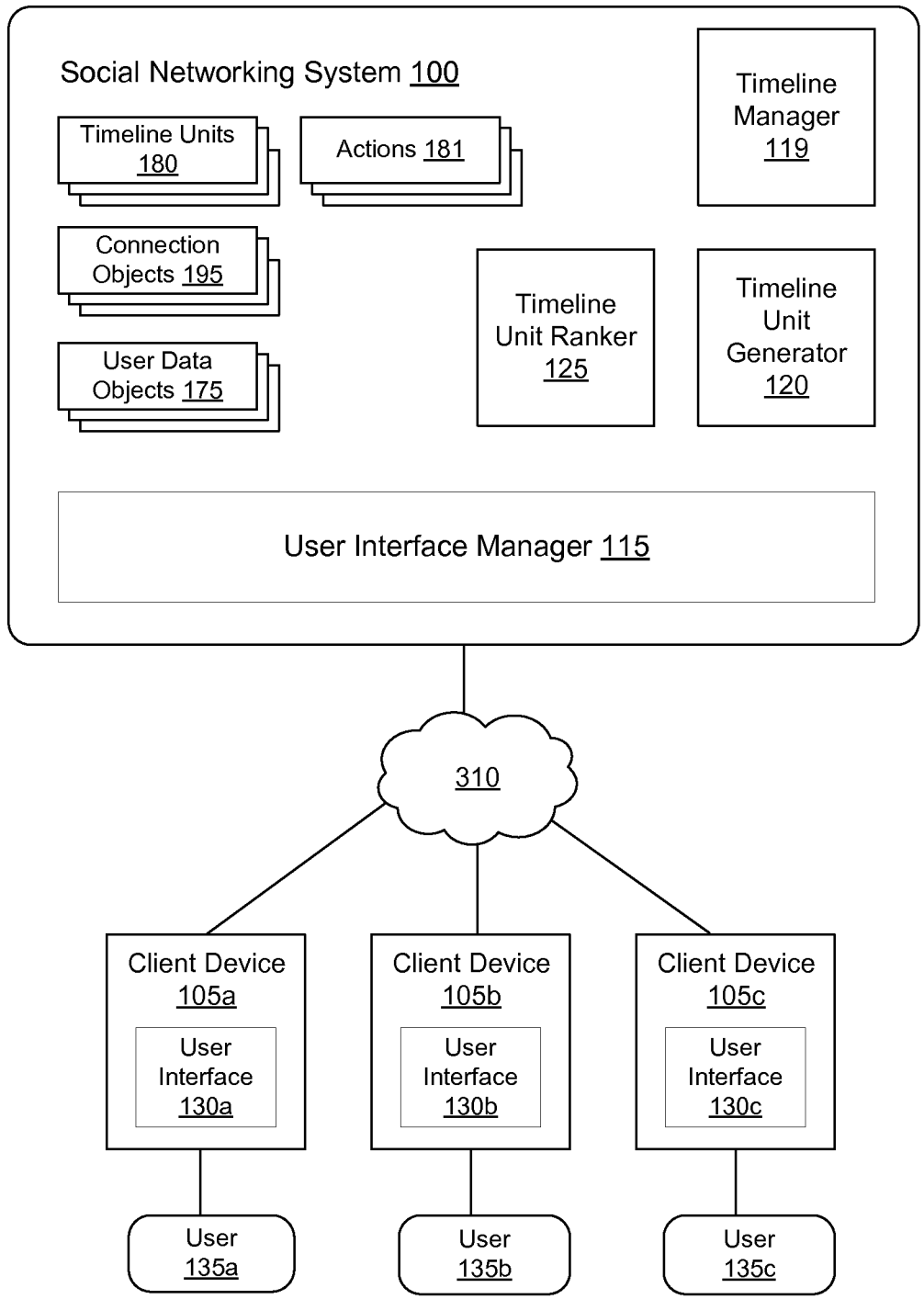
FIG. 1 is a diagram of a system environment for presenting timeline interfaces to users of a social networking system, in accordance with an embodiment of the invention.

FIG. 1 is a diagram of a system environment for presenting timeline units on a timeline, pertaining to a user of a social networking system, to other users of a social networking system, in accordance with an embodiment of the invention. The users 135 interact with the social networking system 100 using client devices 105. Some embodiments of the systems 100 and 105 have different and/or other modules than the ones described herein, and the functions can be distributed among the modules in a different manner than described here.

The social networking system 100 offers its users the ability to communicate and interact with other users of the social networking system 100. Users 135 join the social networking system 100 and then add connections to other users of the social networking system 100 to whom they wish to be connected. When a user joins the social networking system 100 they may create a user account. The user account enables the user to maintain a persistent and secure identity on the social networking system 100. The user account may include a user profile that stores details about the user, such as name, age, sex, etc. When the social networking system 100 performs an action with the user, this action may be conducted with the user account, and not literally with the user (the human being) who controls the user account. For example, when the social networking system 100 "creates a connection" between two users, what actually happens is that the social networking system 100 creates a connection between the user accounts of the two users. User accounts may be created not only for individuals but also for other entities such as corporations, non-profits, fictional characters, etc. A "user" of the social networking system 100 can be any such entity.

In one embodiment the client device 105 used by a user 135 for interacting with the social networking system 100 can be a personal computer (PC), a desktop computer, a laptop computer, a notebook, or a tablet PC. These computers may execute an operating system, for example, a Microsoft Windows-compatible operating system (OS), Apple OS X, and/or a Linux distribution. In another embodiment, the client device 105 can be any device having computer functionality, such as a personal digital assistant (PDA), mobile telephone, smartphone, etc.

The interactions between the client devices 105 and the social networking system 100 are typically performed via a network 310, for example, via the internet. The network 310 enables communications between the client device 105 and the social networking system 100. In one embodiment, the network 310 uses standard communications technologies and/or protocols. Thus, the network 310 can include links using technologies such as Ethernet, 802.11, worldwide interoperability for microwave access (WiMAX), 3G, digital subscriber line (DSL), asynchronous transfer mode (ATM), InfiniBand, PCI Express Advanced Switching, etc. Similarly, the networking protocols used on the network 310 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 310 can be represented using technologies and/or formats including the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. In another embodiment, the entities can use custom and/or dedicated data communications technologies instead of, or in addition to, the ones described above. Depending upon the embodiment, the network 310 can also include links to other networks such as the Internet.

The client device 105 executes a user interface 130 to allow the user 135 to interact with the social networking system 100. The user interface 130 allows the user to perform various actions associated with the social networking system 100 and view information provided by the social networking system 100. The actions performed using the user interface 130 include adding connections, posting messages, posting links, uploading images or videos, updating the user's profile settings, and the like. The information provided by the social networking system 100 that can be viewed using the user interface 130 includes, images or videos posted by the user's connections, comments posted by the user's connections, messages sent to the user by other users, and wall posts. In an embodiment, the user interface 130 is presented to the user via a browser application that allows a user to retrieve and present information from the internet or from a private network. In another embodiment, the user interface 130 consists of a mobile app running on a mobile device such as a smart phone or tablet. In yet another embodiment, the user interface 130 consists of an application running on a desktop or laptop computer.

The user interface 130 allows users to view the data of other users of the social networking system 100; the data of users of the social networking system can be presented to other users by way of a "profile page," which is an arrangement of the users' social networking data. In one embodiment the profile page consists of data and code in a web standard format presented through a browser. For example, the profile page may consist of combination of any of XML, HTML, CSS, Javascript, plaintext and Java sent from a server to a web browser running on a client. In another embodiment the profile page consists of data formatted for presentation through a mobile app or desktop application. When a user 'A' views the profile or data of another user 'B' the first user 'A' is called the 'viewing user', and the second user 'B' is called the 'subject user'. The user interface 130 also allows a viewing user to explore information about a subject user via a timeline interface generated by the timeline manager 119, described in more detail herein. The timeline interface may present a viewing user with the information of a single subject user, or it may present the viewing user with the data of several subject users simultaneously.

The social networking system 100 maintains different types of data objects, for example, user data objects 175, connection objects 195, and objects representing timeline units 180 and actions 181. A user data object 175 stores information related to a user of the social networking system 100. For example, a user data object 175 may store a user's date of birth, or may store a photo of the user, or may store a reference to a photo of the user. A connection object 195 stores information describing the relationship between two users of the social networking system or in general any two entities represented in the social networking system 100. An action object 181 stores information related to actions performed by users of the social networking system 100. Almost any activity of a user of a social networking system can be stored as an action. For example, an action can be the posting of a new comment or status update, or it can be something as simple as forming a connection to another user.

The social networking system 100 may maintain a social graph that tracks the relationship between the various objects, users, and events captured by the social networking system 100. In the social graph the users, the user data, and other entities, exist as nodes that have edges that are connections to other nodes. In this embodiment the edges represent actions that create a relationship between the nodes. For example, a node representing a photograph stored in the social networking system 100 may have an edge to a user that uploaded the photograph, and this edge may be an "uploaded by" action. The same photograph may have edges to several other nodes that represent the users in that photograph, and these edges may be "tagged in" actions. Similarly, a node representing a user in the social networking system 100 may have edges to each node representing posts made by that user. These edges may all be "posted by" actions. The edges in the social graph can have different types that correspond to the different types of actions taken by users of the social networking system 100.

The social networking system 100 may maintain or compute a measure of a user's "affinity" for other users (or objects) in the social networking system 100. The measure of affinity may be expressed as an affinity score, which may represent that user's closeness to another user (or object) of the social networking system 100. The affinity score of a user X for another user Y can be used to predict, for example, if user X would be interested in viewing or likely to view a photo of user Y. The affinity scores can be computed by the social networking system 100 through automated methods, including through predictor functions, machine-learned algorithms, or any other suitable algorithm for determining user affinities. The social networking system 100 may store an archive of historical affinity scores for a user as their affinity scores for various users and objects changes over time. Systems and methods for computing user affinities for other users of a social networking system 100, as well as for other objects in the system, are disclosed in U.S. application Ser. No. 12/978,265, filed on Dec. 23, 2010, which is incorporated by reference in its entirety.

A timeline unit 180 consists of data and/or actions related to users from a particular time period. The timeline unit 180 is used to aggregate user data/actions for presentation on a timeline. In one embodiment a timeline unit contains data/actions related to a single user. In another embodiment a timeline unit contains the common data/actions across two or more users. A timeline unit may contain just a single action or a single piece of data, or it may contain multiple actions and data that are related in some way. For example, photos and status updates from a single event may be grouped into one timeline unit. In one embodiment, a timeline unit may be "displayed" by generating a displayable representation of the data contained in the timeline unit, and sending this displayable representation to a client device 105 where the visual representation can be rendered as part of the user interface 130 that can be viewed by a user 135. The user data objects 175, connection objects 195, timeline units 180 and actions 181 are described in more detail herein.

The social networking system 100 also comprises a user interface manager 115, a timeline manager 119, a timeline unit ranker 125, and a timeline unit generator 120. The user interface manager 115 allows users of the social networking system 100 to interact with the social networking system 100 via the user interface 130. The user interface manager 115 manages the presentation of information to a user. The user interface manager 115 presents information to users via the user interface 130. Depending on the type of information being displayed to a user, the user interface 130 may display a timeline generated with the help of the timeline manager 119. In one embodiment the timeline is a visualization of a user's social information (data and actions) displayed in a navigable chronological sequence. In another embodiment the timeline is a joint visualization of multiple users' common social information displayed in a navigable chronological sequence (i.e. the timeline shows social information from the intersection of all the users' information). In a different embodiment the timeline is a joint visualization of multiple users' social information containing information taken from all the users' data (i.e. the timeline shows social information from the union of all the users' information). The social information is displayed on the timeline in the form of timeline units 180 that are generated by the timeline unit generator 120.

The timeline unit generator 120 generates timeline units 180 from the actions 181 and the user data objects 175. The timeline unit ranker 125 ranks the timeline units 180 based upon their relevance to and/or preferences of users (the subject users, viewing users, or both). In one embodiment, the timeline unit ranker 125 uses scores output by machine-learned models to rank the timeline units 180. The timeline manager 119 selects timeline units generated by the timeline unit generator 120 and sends them, or a displayable representation of them, to the client device 105. At the client 105 the timeline units are converted to a displayable representation—if not already in such a form—and are displayed in a timeline interface. The timeline manager 119 may use the ranking provided by the timeline unit ranker 125, user curation, or a combination of both, when selecting timeline units for display in the timeline interface.

System Details

Figure 3:
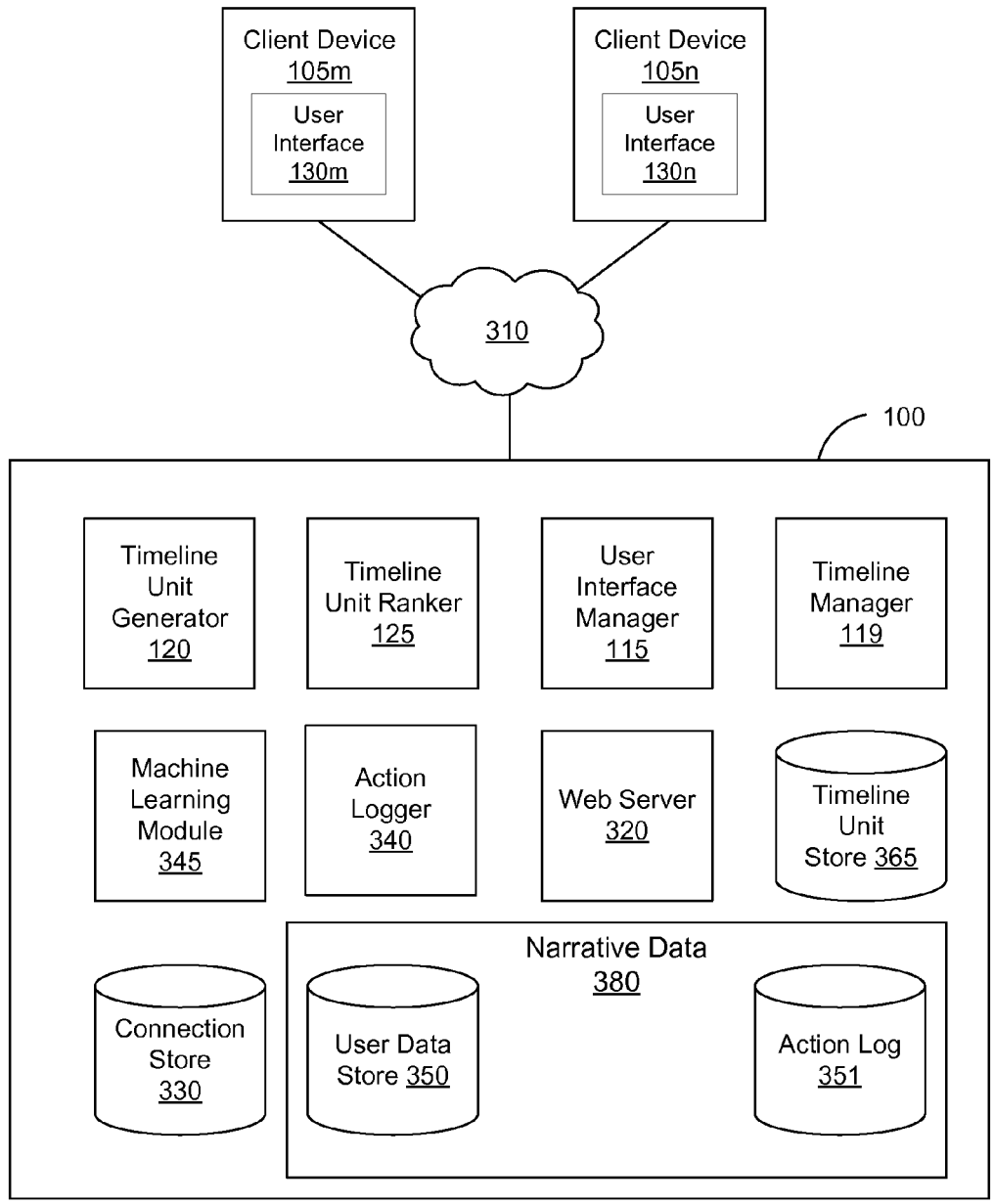
FIG. 3 is a diagram of the system architecture of a social networking system for generating timeline units that may be visually presented to users, in accordance with an embodiment of the invention.

FIG. 3 is a diagram of the system architecture of a social networking system 100 for generating timeline interfaces for presentation to viewing users, in accordance with an embodiment of the invention. The social networking system 100 includes a web server 320, a user interface manager 115, a timeline manager 119, an action logger 340, an action log 351, a user data store 350, a connection store 330, a machine-learning module 345, a timeline unit store 365, a timeline unit generator 120, and a timeline unit ranker 125. In other embodiments, the social networking system 100 may include additional, fewer, or different modules for various applications. Conventional components such as network interfaces, security mechanisms, load balancers, failover servers, management and network operations consoles, and the like are not shown so as to not obscure the details of the system.

The social networking system 100 allows users to communicate or otherwise interact with each other and access content. The social networking system 100 stores user data objects 175 in the user data store 350. The information captured in the user data objects 175 relates to the users of the social networking system 100, and includes biographic, demographic, and other types of descriptive information, such as age, work experience, educational history, interests, gender, sexual preferences, hobbies or preferences, location, income, languages spoken, ethnic background, and the like. The information in the user data objects 175 may also include information captured by third-party applications that interface with the social networking system 100, such as, for example, status updates from social applications, high scores posted from game applications, and music played in media applications. Information about a user captured in the user data objects 175 may be explicitly provided by a user or may be inferred from actions and other data of the user. For example, interests of a user can be inferred from the type of content accessed by the user. The user data store 350 may store other types of information provided by the user, for example, images, videos, documents, likes indicated by the user, comments, status updates, recommendations of images, videos, or uniform resource locator (URL) links, and the likes. Images and video of users may be tagged with the identification information of the users of the social networking system 100 that are displayed in the images and video.

The connection store 330 stores data describing the connections between different users of the social networking system 100, for example, as represented in a connection object 195. The connections are defined by users, allowing users to specify their relationships with other users. For example, the connections allow users to generate relationships with other users that parallel the users' real-life relationships, such as friends, family, co-workers, partners, and so forth. In some embodiment, the connection specifies a connection type based on the type of relationship, for example, family, or friend, or colleague. Users may select from predefined types of connections, or define their own connection types as needed.

Connections may be added explicitly by a user, for example, the user selecting a particular other user to be a friend, or automatically created by the social networking system 100 based on common characteristics of the users (e.g., users who are alumni of the same educational institution). Connections in social networking system 100 are usually in both directions, but need not be, so the terms "connection" and "friend" depend on the frame of reference. For example, if Bob and Joe are both connected to each other in the social networking system 100, Bob and Joe, both users, are also each other's friends. The connection between users may be a direct connection; however, some embodiments of a social networking system 100 allow the connection to be indirect via one or more levels of connections. Connections may also be established between different types of entities for example, the social networking system 100 can have an object representing a school and users of the social networking system 100 that study in the school or who are alumni of the school can connect with the school in the social networking system 100.

The social networking system 100 may include a mechanism that suggests new connections to users. The social networking system 100 may generate these suggestions based on existing information stored in the system, or it may provide a mechanism for users to suggest connections to other users. For example, the social networking system 100 may suggest that Bob add a "family" connection to Jill, based on Bob's existing "family" connection to Steve, and Steve's existing "family" connection to Jill. In the same example, the social networking system 100 may also allow Steve to suggest Jill as a "family" connection to Bob.

The web server 320 links the social networking system 100 via the network 310 to one or more client devices 105; the web server 320 serves web pages, as well as other web-related content, such as Flash, XML, and so forth. The web server 320 provides the functionality of receiving and routing messages between the social networking system 100 and the client devices 105 as well as other external systems. These messages can be instant messages, queued messages (e.g., email), text and SMS (short message service) messages, or any other suitable messaging technique. In some embodiments, a message sent by a user to another can be viewed by other users of the social networking system 100, for example, by the connections of the user receiving the message. An example of a type of message that can be viewed by other users of the social networking system 100 besides the recipient of the message is a wall post.

The action logger 340 is capable of receiving communications from the web server 320 about user actions on and/or off the social networking system 100. The action logger 340 populates the action log 351 with information about user actions to track them. When a user performs actions using the social networking system 100, action logger 340 adds entries called actions 181, to the action log 351. Any action that a particular user takes with respect to another user is associated with each user's profile, through information in the actions 181 stored in the action log 351. Such actions may include, for example, adding a connection to the another user, sending a message to the another user, posting a photo containing another user, changing relationship status with another user, attending an event posted by another user, among others. In addition, a number of actions described in connection with other objects are directed at particular users, so these actions are associated with those users as well. Some actions may be taken by users while not connected to the social networking system 100, and these actions may be logged by a local application and transmitted to the social networking system 100 when a connection is finally made.

The user data stored in the user data store 350 and the actions stored in the action log 351 are collectively called the narrative data 380. This narrative data 380 is what forms the basis for building the timeline units for subject users. Narrative data 380 may have a time and a location associated with it. The time and location associated with the narrative data can be the time and location when/where the social networking system 100 captured that particular user data or action, or it can be a different time and location associated with, for example, the creation of a particular piece of user data, or the occurrence of a real world event. An item of narrative data 380 may have multiple times and locations associated with it. For example, a photograph of a user may be associated with the time and location that photograph was taken as well as the time and location that photograph was uploaded into the social networking system 100. An item of narrative data 380 that represents a user's change of relationship status from single to married may also have multiple times and locations associated with it; one time may be the date and location of that user's marriage and the other time and location may be the time and location that the user's relationship status was changed on the social networking system 100. In one embodiment the narrative data 380 is represented by nodes in a social graph that contain data (such as image data, text data, video data) and connections that connect the narrative data nodes to other nodes, including nodes that represent the actors or users associated with the data.

The timeline unit generator 120 generates timeline units from user narrative data that may be selected by the timeline manager 119 for display in a timeline interface. In one embodiment the timeline unit generator 120 selects items from the narrative data 380 that are associated with a single subject user and extracts information describing these items from narrative data 380 to generate timeline units 180 that may be used to construct a timeline for that subject user. In another embodiment the timeline unit generator 120 selects items from the narrative data 380 that are associated with multiple subject users and generates timeline units that may be used to construct a common timeline for all these subject users.

In one embodiment the timeline units 180 are represented as nodes in a social graph that have connections to other nodes representing narrative data and users. In one implementation, timeline units 180 are a sub-type of a more general aggregation called a story. Stories are a way for the social networking system 100 to aggregate data to display to users. In this embodiment timeline units are a specific incarnation of stories that are configured for display on a timeline interface.

Stories can be used in contexts outside the timeline interface and are discussed in more detail herein.

A timeline unit is associated with a distinct time period, and is generated from narrative data that is taken from that time period. A timeline unit will usually not contain narrative data from more than one time period. For example, a timeline unit could contain narrative data for the month of January, 2010, but that timeline unit would not contain narrative data from another month. However, there can be timeline units with different granularities of time periods. For example, there may be timeline units for time ranges of days, weeks, months, and years. Timeline units for the year 2010 may contain some overlapping narrative data with the timeline units generated for say January, 2010, since those time periods overlap.

In one embodiment, a timeline unit generated for a time period may be generated from narrative data over the entire time range of that time period, and thus may function as a "report" of the most interesting narrative data over the entire time period. For example, a single timeline unit generated for the month of January, 2010, may be generated from every photo posted by the subject user in the month of January, 2010, and thus may serve as the user's "photos" report for that month.

In another embodiment, a timeline unit may contain only a few pieces of narrative data clustering around a single time within the time period. For example, for the January, 2010, time period a timeline unit may be generated for a user's birthday that falls on a particular day in that month, and this timeline unit may contain photos, status updates, and public messages received by the user on her birthday. In another example, a timeline unit may be generated from a single significant piece of narrative data. For example, say the subject user becomes engaged on Jan. 25, 2010, a single timeline unit may be generated for this event on that date.

The timeline units 180 may be sent to a client 105, either directly or after conversion to a displayable form, where they are used to display representations of the selected items of narrative data, through a timeline interface displayed as part of the user interface 130. The timeline unit generator 120 may obtain the information describing the selected narrative data from the action log 351 and user data store 350, or it may obtain this information directly from other modules, such as the action logger 340, the user interface manager 115, or other modules that implement functionality for performing different types of actions and collecting different types of data.

The timeline units 180 generated by the timeline unit generator 120, when converted to visual form, may display only a subset of the information in the narrative data that they were generated to represent. For example, a timeline unit generated from a subject user's photo album, when converted to visual form, may display only a subset of the photos in the album, and may display these photos in a reduced-size thumbnail format. In another example, a blog entry by a subject user may be reduced to a short summary of a few lines when presented in a visualized timeline unit.

A timeline unit may contain multiple pieces of narrative data within a time period, or it may contain only a single piece of narrative data. Each timeline unit has a time and location associated with it, which may be used when chronologically ordering multiple timeline units in a timeline interface, or placing timeline units on a timeline map interface. If the timeline unit contains only a single piece of narrative data, the time and location associated with the timeline unit is the same as that of the narrative data. If the timeline unit contains multiple pieces of narrative data, the time and location associated with the timeline unit may be computed from the times and locations associated with those pieces of narrative data. For example, the timeline unit may be associated with the mean of the times of the narrative data, or it may be associated with the median of the times of the narrative data. Or, for example, the timeline unit may be associated with the time of the newest or oldest narrative data that it contains. The location of a timeline unit may be determined, for example, by taking the geometric center point of the locations of the narrative data.

The timeline unit generator 120 may determine that a subject user would prefer not to display certain narrative data in timeline units on their timeline. For example, an action describing a subject user hiding a comment posted by another user, or a subject user changing certain types of user preferences, may not be interesting subject matter for display on a timeline. The user interface 130 may give the subject user the ability to explicitly indicate that certain types of narrative data are not to be shown as part of timeline units. In addition, the timeline unit generator 120 may prevent the generation of timeline units based on certain narrative data as a matter of policy, enforced by the social networking system 100. For example, the subject user's viewing the profile of another user or the subject user's sending a private message to another user may be actions that are excluded from timeline units due to privacy concerns. Furthermore, the timeline unit generator 120 may consider the privacy settings with respect to individual viewing users to determine whether certain narrative data of a subject user can be presented in timeline units visible to those viewing users. A subject user may set her privacy settings to limit the set of people to whom certain timeline units may be shown. For example, a subject user may allow only her immediate connections to view timeline units which contain photos of her, whereas another subject user may allow anyone to view timeline units which contain her photos. A subject user may also individually block viewing users from viewing specific timeline units on a unit by unit basis and user by user basis, or may block user-defined groups of viewing users. For example, a subject user may define a set of users to be "co-workers" and block those users, as a group, from viewing timeline units that contain photos of her. Conversely, users or groups of users that were previously blocked from viewing timeline units can be given permission to view the content in a similar user-by-user and unit-by-unit basis, or by groups.

In an embodiment, the timeline unit generator 120 stores the timeline units 180 generated in the timeline unit store 365. The timeline units in the timeline unit store 365 may be represented as database entries that link various objects related to the timeline units 180. Each timeline unit 180 stored in the timeline unit store 365 can be associated with other entities in the social networking system 100. For example, a timeline unit 180 may be associated with one or more users that performed an action described in the timeline unit 180. The users that performed the actions described in the timeline unit are called the actors. For example, if the timeline unit describes a comment posted by John on a video posted by Jack, both John and Jack can be considered actors of the timeline unit. As another example, a timeline unit 180 describing a comment posted by a user in response to another user's wall post may be associated with both the user who posted the message on the wall and the user who posted the comment.

In an embodiment the timeline unit generator 120 generates timeline units 180 that can be visualized directly without additional processing. In another embodiment, the timeline unit generator 120 generates timeline units 180 that must be combined with visual templates provided by the user interface manager 115 to create displayable representations of the timeline units that can then be sent to the client 105 for display on the time line interface displayed on the user interface 130. In yet another embodiment, the visual templates provided by the user interface manager 115 and the timeline units 180 are both sent to the client 105, where the client combines them to create a displayable representation of the timeline unit for display on the time line interface displayed on the user interface 130.

Although the timeline unit generator 120 may generate timeline units before any request is received from the timeline manager 119, it is also possible in another embodiment for the timeline unit generator to generate timeline units in response to requests from the timeline manager 119, for example, just in time to meet a request from a viewing user.

The Timeline Interface

Figure 2A:
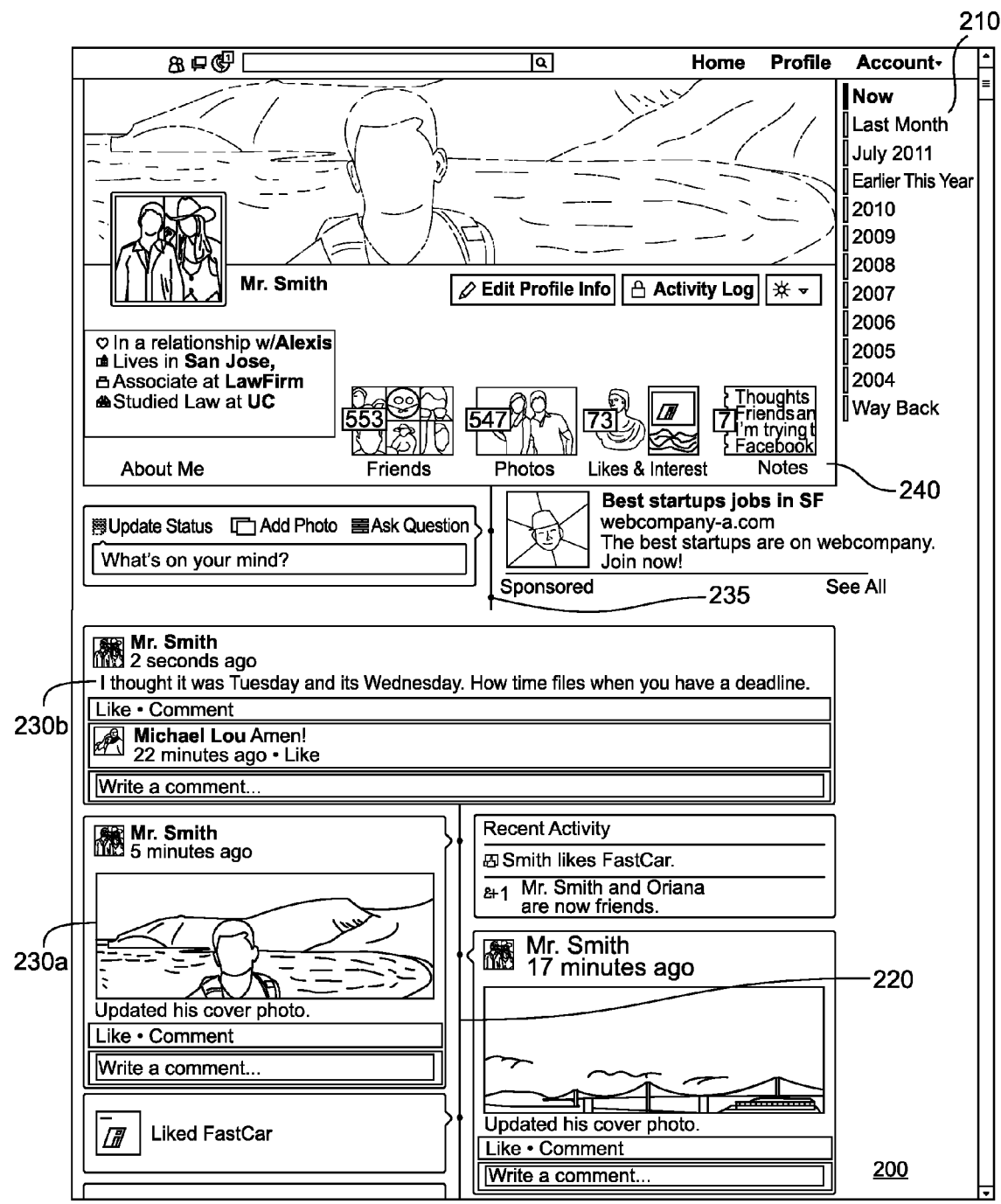
Figure 2B:
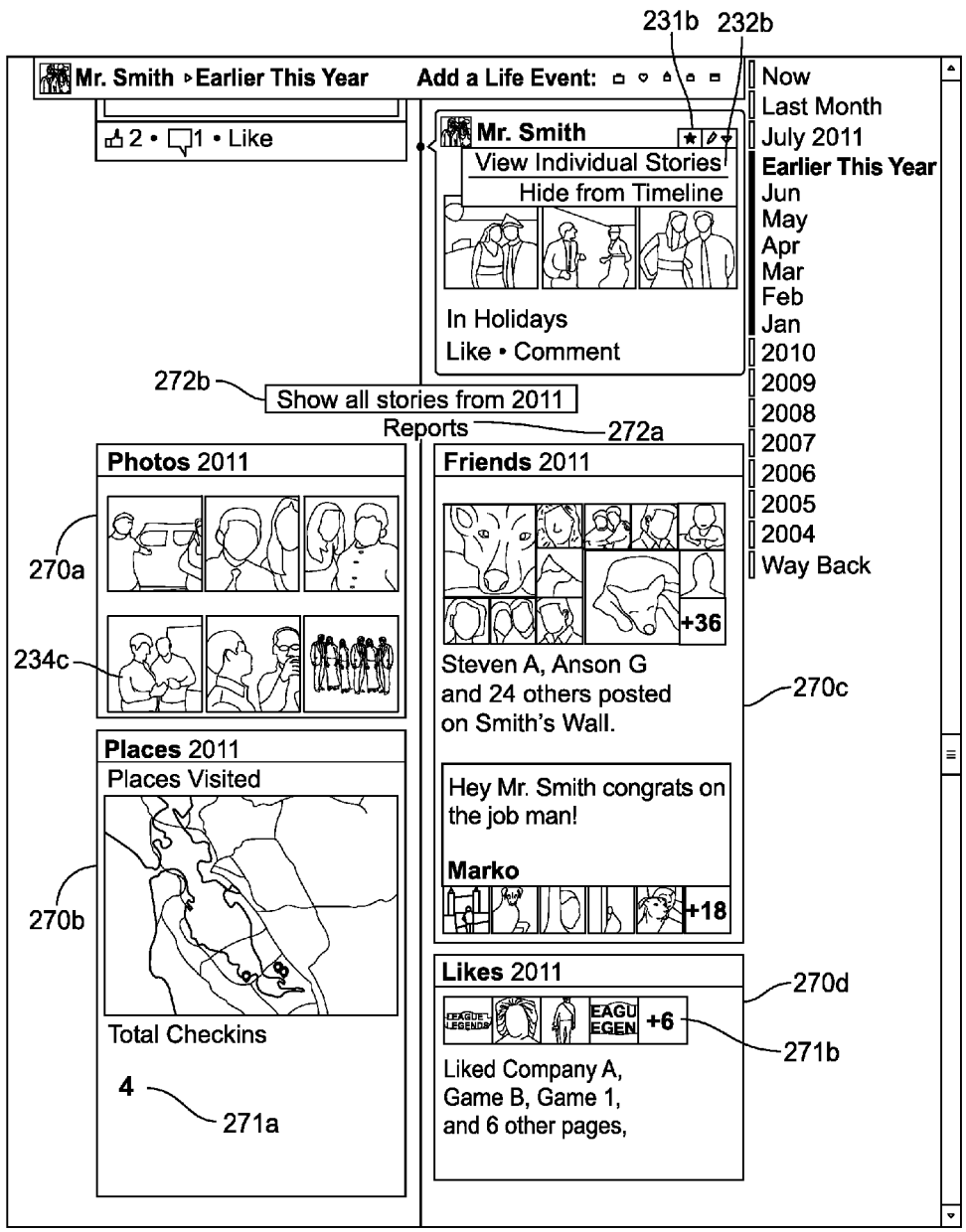
Figure 2C:
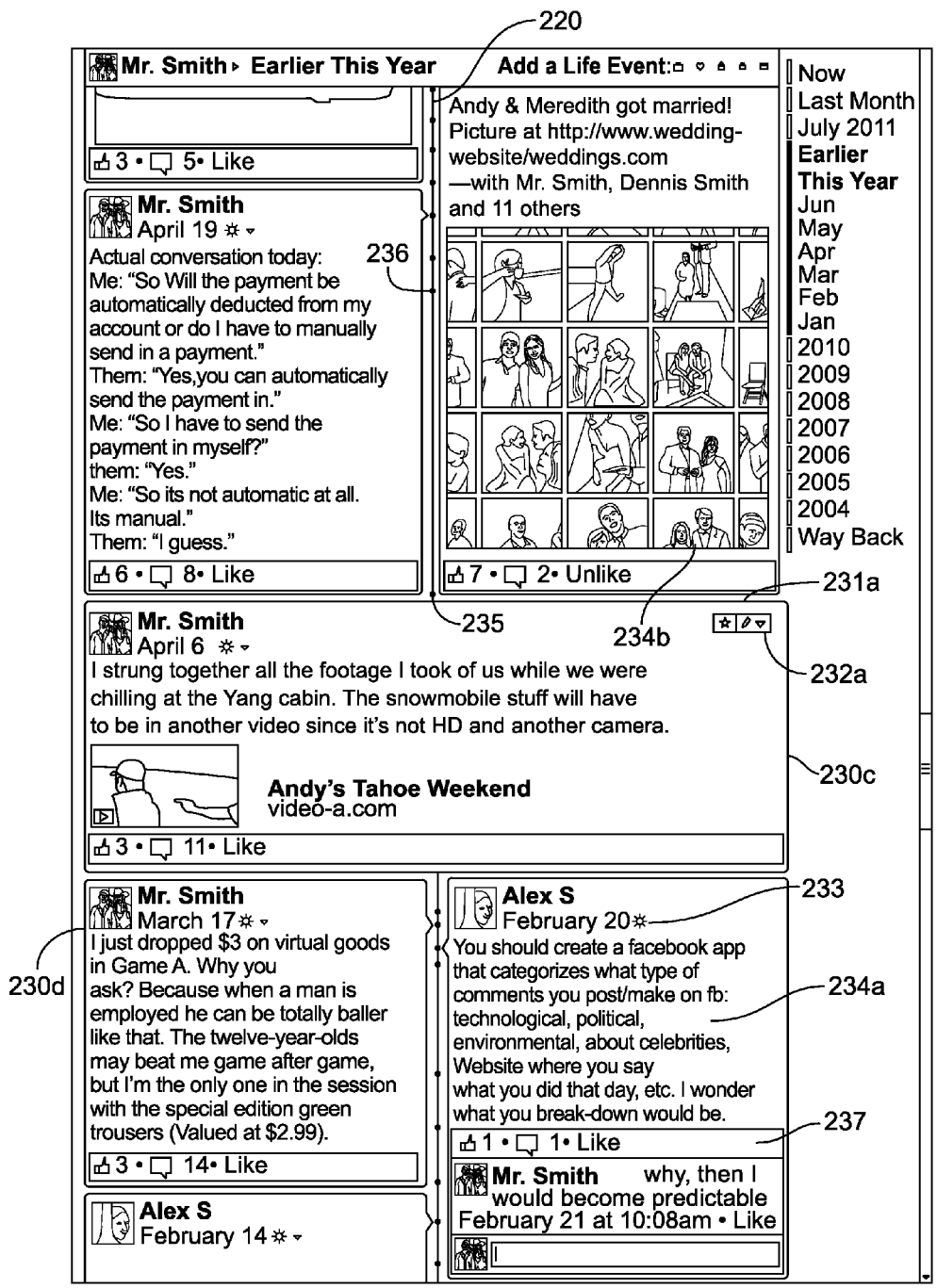

The timeline manager 119 manages the presentation of subject user timelines to viewing users of the social networking system 100. The user interface manager 115 presents viewing users with an option, through the user interface 130, to browse a subject user's narrative data 380 through a timeline interface 200, one embodiment of which is illustrated in various states in FIGS. 2A, 2B, 2C, 2D, and 2E. The timeline interface 200 is just one display option of the user interface 130, and the user interface 130 may allow users to interact with and view a subject user's narrative data 380 through other display options as well (for example, a timeline map interface as illustrated in FIG. 2H, and an action log as illustrated in FIG. 2G). The timeline interface 200 (including all its components such as the timeline, timeline units, etc.) may be displayed as part of the user profile web page 201 as in FIG. 2A, or it may be an independent screen or even an independent application running on the client device 105. The timeline interface 200 may include a time period selector 210, a timeline 220, and the visual representations of the timeline units 230 that have a timeline marker 235 on the timeline 220. The timeline interface may also include a title box 240, one embodiment of which is illustrated in more detail in FIG. 2F.

The timeline manager 119 determines the time periods to display to the viewing user based on the viewing user's request, and generates timeline units 180 for the displayed time periods, or selects pre-generated timeline units 180 associated with the subject user from the timeline unit store 365 for the displayed time periods. The timeline manager 119 may present viewing users with a predefined time period selector 210 (as illustrated in FIG. 2A) or the timeline manager 119 may give users the ability to define the bounds of a time period they wish to view, i.e. the displayed time periods will be of user determined length as opposed to a length fixed by the timeline manager 119.

Once a viewing user selects the time period for viewing, the timeline manager 119 generates a timeline interface 200 which includes renderings of timeline units from this time period on the timeline 220. The timeline 220 is a visual representation of the subject user's narrative data over time. FIG. 2C illustrates one embodiment of the timeline 220, with displayed timeline units 230 rendered in two columns on either side of the timeline 220. The timeline 220 includes timeline markers 235 that show the position of a connected timeline unit on the timeline 220. The timeline 220 may not fully display all the timeline units for a given time period. The timeline units that are not displayed fully may still have corresponding markers on the timeline 220, but these muted markers 236 may be "grayed out", lightened, or de-emphasized in some other way in order to distinguish them from the active or fully displayed timeline markers 235. When the viewing user interacts with the muted markers 236, for example by moving a mouse-cursor over them, the muted timeline unit may be displayed in a pop-up 250 as illustrated in FIG. 2E. The timeline manager 119 may allow the subject user (or viewing user) to permanently maximize a muted timeline unit by clicking a "maximize" or "show" button on the displayed timeline unit pop-up 250. The showing or maximization of a muted timeline unit may be used as a signal by the timeline manager 119 to display the same timeline unit (or similar timeline units) in the future. This signal also captures the preference of subject users and/or viewing users and may also be used by the timeline unit ranker 125 to improve its scoring of timeline units. The ranking process is described in more detail herein.

As illustrated in FIG. 2C, the visual representations of the timeline units 230 may have distinct visual elements such as a header 233 that displays the name and/or thumbnail photo of the social network user that posted the narrative data that is incorporated in that displayed timeline unit. The header 233 may also include a date when the narrative data was uploaded or created on the social networking system 100. A timeline unit may also include a "pin" or "star" button 231 that can be used by a user to indicate that the timeline unit is of interest to them. Activating the star button 231 may cause the timeline unit to become more prominently displayed, for example, as in the embodiment illustrated in FIG. 2C, the visual representation of the timeline unit 230c is enlarged when "starred" and it is overlaid on top of the timeline 220, and occupies both sides of the timeline (notice other timeline units are restricted to the left side or right side of the timeline 220). The visual representation of the timeline 230 may also include an options menu 232 that may contain additional user configuration options such as options to hide a timeline unit, share a timeline unit with another user of the social networking system 100, and split a timeline unit into smaller timeline units based on individual narrative data, etc.

The visual representations of the timeline units 230 will also include a narrative data summary 234. The narrative data summary 234 may be textual as in 234a in FIG. 2C, or it may be image based, as in the narrative data summary 234b, or it may be a video, or some other media, such as an animated GIF or FLASH content. The narrative data summary is a distillation of the narrative data used to generate the timeline unit, and it will not always contain a representation for all the narrative data that the timeline unit was generated from. The timeline manager 119 may take advantage of a ranking process to determine the most relevant narrative data to display in the narrative data summary 234.

The displayed timeline units 230 may also include a social data summary 237. The social data summary 237 gives viewers information on, for example, the number of comments, "likes," views, shares, and other user interactions that the narrative data in that timeline unit has received. The social data summary 237 may also display the top comments left by other users of the social networking system 100 on the narrative data.

The embodiment of the timeline 220 illustrated in FIG. 2C shows timeline units 230 ordered by time, flush against each other, and with their timeline markers 235 and muted markers 236 spaced on the timeline 220 so that they are distinguishable. In another embodiment the timeline units 230, the markers 235 and muted markers 236 are spaced on the timeline 220 in proportion to the actual time between the units. For example, if the time period is for the month of January, and there are three timeline units, one on January $1^{st}$, one on the $2^{nd}$, and one on the $30^{th}$, then the first two timeline units will be flush against each other while the third timeline unit will be separated by a significant gap corresponding to the space for the 27 days between the last two timeline units. In a different embodiment, the timeline units 230, the markers 235, and the muted markers 236 are spaced on the timeline 220 in proportion to the actual time between the units, but the time scale of the timeline 220 is varied so that the scale is larger for time periods that have a greater density of timeline units, and the scale is smaller for time periods that have a lower density of timeline units. For example, in the above example where there are three timeline units on January $1^{st}$, $2^{nd}$, and $30^{th}$, the space between the timeline unit on the $1^{st}$ and the $2^{nd}$ will be proportional to time, but the space between the timeline unit on the $2^{nd}$ and the $30^{th}$ may be compressed if there are no other timeline units between them.

The time period selector 210, one embodiment of which is illustrated in FIG. 2E, includes a chronologically ordered list of selectable time periods. In this embodiment the time period selector 210 displays selectable sections for the most recent three months (in FIG. 2E Now, Last Month, and July 2011), and then sections by year thereafter. If the user has many years of information the years themselves may be collected into decades, and only the most recent three years may be displayed in the time period selector 210. When a user selects a time period from the time period selector 210, the timeline 220 scrolls (or refreshes) to show the selected time period. When a user selects a time period from the time period selector 210, the timeline interface 200 may display a floating timeline header 252 at the top of the timeline 220. The timeline header 252 may display the name of the subject user as well as the currently selected time period (e.g., in FIG. 2E it is 2009). Selecting a time period may also cause the time period selector 210 to expand the selected time period into a selectable list of smaller sub-periods 251. In the example illustrated in FIG. 2E, selecting 2009 causes the expansion of the year 2009 into a list of selectable months for the year 2009. The time period selector 210 may visually indicate the selected time period by highlighting the selected time period with an appropriate visual cue, for example, with a bold font, underlining, color, size change, a sliding window, etc. The time period selector 210 may also indicate the time periods that have more narrative data or more relevant narrative data using a similar highlighting scheme. For example, if the month of July in 2009 has more relevant or interesting timeline units, then that month may be highlighted with a special color in the time period selector 210 to make it more prominent. In addition, if a time period has more or more relevant timeline units, the timeline 220 itself may be highlighted in the portion corresponding to this time period to indicate that this period is more significant. The time periods with more or more relevant timeline units may also be broken into finer grained granularity in the time period selector 210, to indicate to users that there is more relevant data in these periods.

Figure 2D:
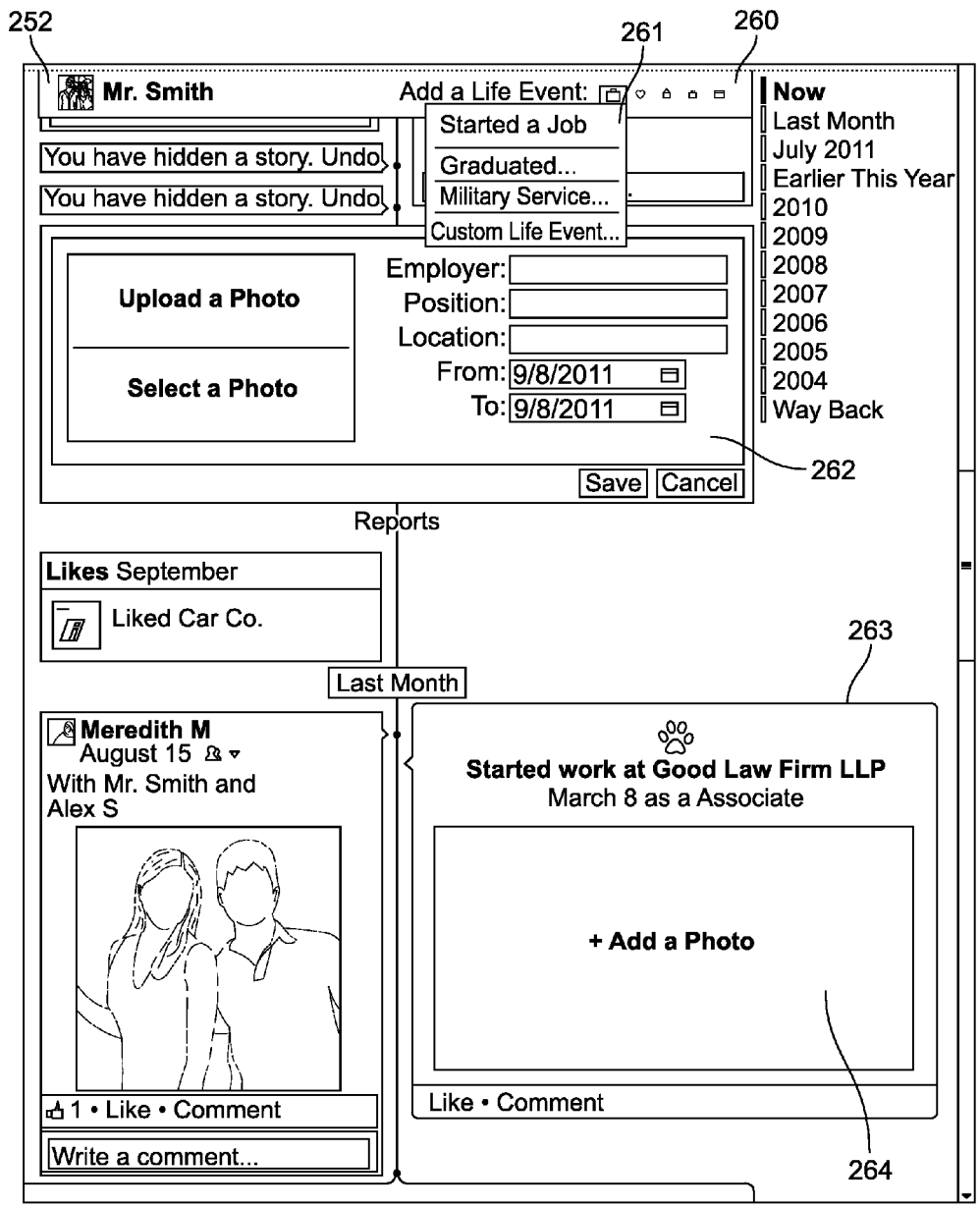
Figure 2E:
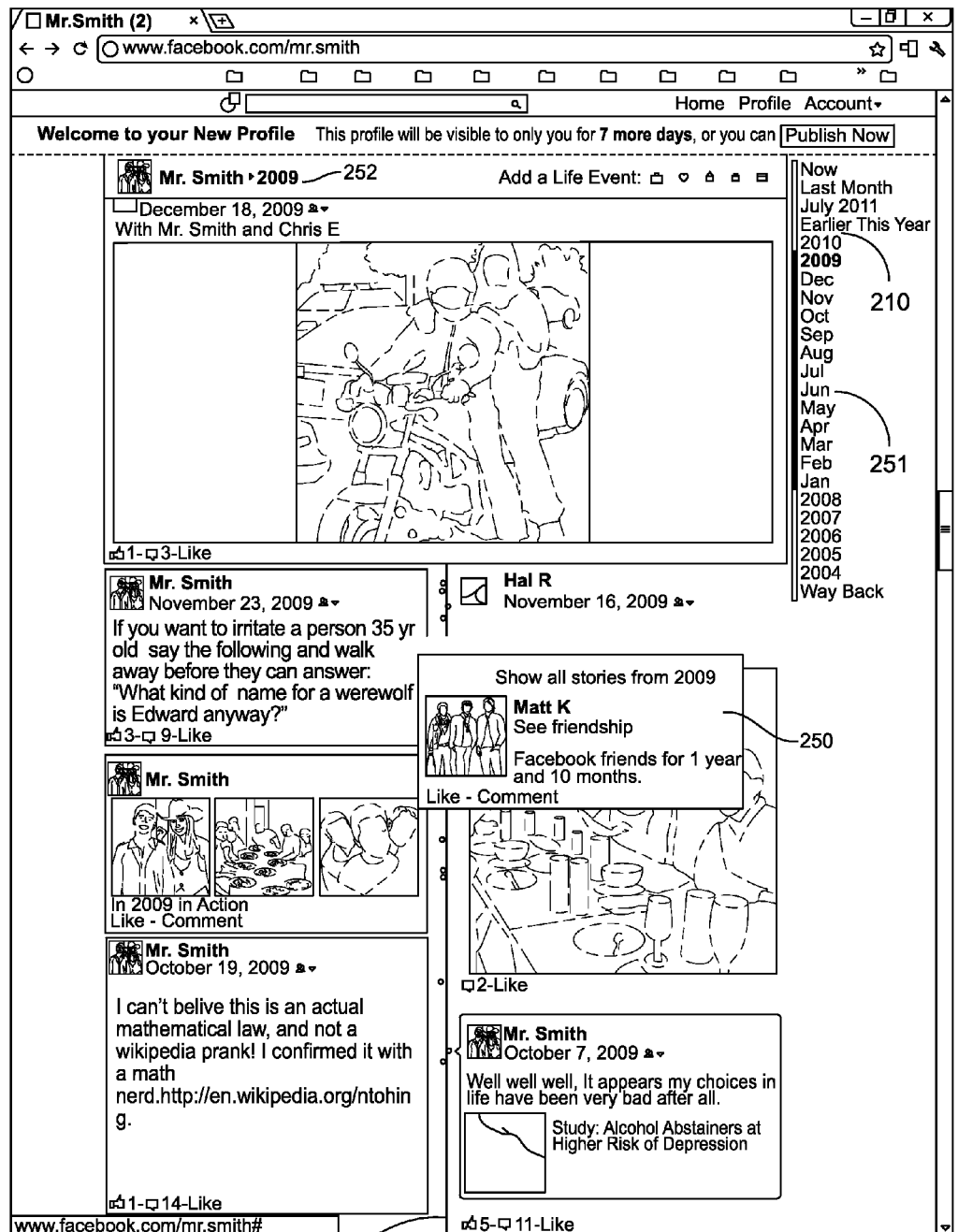

The timeline header 252 may also include an add event menu 260, as illustrated in FIG. 2D. The add event menu 260 enables a subject user to add structured data to their own timeline, in effect generating a user-created timeline unit. The add event menu may offer the user event options 261 for many different event types. Selecting an event option 261 causes an event data entry interface 262 to appear, where the event data entry interface 262 is configured to capture data for that event type. When the user enters information into the event data entry interface 262 and hits the save button, the structured data is sent to the social networking system 100, where it is used to create new narrative data. If the structured data includes an event date, the narrative data can be used by the timeline manager 119 to generate new timeline units 180 that can be situated on the timeline 220 at the provided date. For example, in FIG. 2D the user has selected the option for "Started a Job," which displays an event data entry interface 262 that is configured to capture data to describe the "Started a Job" event. In this example, the interface prompts the user to enter employer, position, location, a photograph and from-to dates. Using this information the timeline manager 119 may generate a "Started Work" timeline unit 263 that can be placed on that user's timeline. If the user fails to provide some information (in this case, e.g., the user has not uploaded a photo), then the new timeline unit 263 can prompt for the missing data with an appropriate data inquiry interface 264 (in the example, the interface prompts the user to "+Add a Photo"). The timeline interface 200 may give users an interface to run queries on structured data that has been collected from users of the social networking system 100.

The timeline interface 200 may offer the user event options 261 such as starting a job, buying a house, getting a new roommate, buying a car, graduating, starting or ending military service, having a medical procedure, learning a language, travelling, etc. If the user cannot find an event option that matches the event they are trying to create data for, the social networking system 100 may allow the user to create a custom event. The add event menu 260, or another similar interface, may also be used by users to add content, such as comments, photos, videos, etc., to a time in the past or future on the timeline 220. When users add new content to the timeline 220, the timeline interface 200 may allow users to upload new content as well as to select existing content from narrative data that has already been captured by the social networking system 100.

The timeline units 180 generated by the timeline unit generator 120 are not always linked to a particular point on the timeline 220. Some timeline units 180 act as "reports" in that they aggregate content across the whole time period and present the user with a summary of activity for that period. FIG. 2B illustrates one embodiment of the displayed report timeline units 270. In FIG. 2B there are four displayed report timeline units 270a (for Photos), 270b (for Places), 270c (for Friends), and 270d (for Likes). The displayed report timeline units 270 are similar to the displayed timeline units 230, but they lack the timeline markers 235, and may be separated from the other timeline units 230 by an appropriate text marker 272 on the timeline 220 (in this example the text marker 272a is titled "reports"). Similar to other timeline units 230, the report timeline units 270 may display a narrative data summary 234. The timeline manager 119 may take advantage of a ranking process to determine the most relevant narrative data to display in the narrative data summary 234. The narrative data summary 234 can vary based on the type of the displayed report timeline unit 270. For example, in FIG. 2B the Places report 270b shows a map indicating locations of timeline units over the time period, while the Photos report 270a shows thumbnails of uploaded photos over the time period. The displayed report timeline units 270 may also include a dynamically updated statistic 271 that displays real-time or nearly real-time information about the particular content of that report. For example, the Places report 270b includes a dynamically updated statistic 271a that indicates the number of user location check-ins in the current time period (in this case 4). As another example, the Likes report 270d includes a dynamically updated statistic 271b that indicates the number of things that the user has "liked" in the current time period (in this case 6).

The text markers 272 may also be placed on the timeline 220 to indicate the transition from one time period to the next, and clicking on the text marker 272 may perform a function such as revealing all muted timeline units in the time period.

For example, in FIG. 2B text marker 272b marks the end of the 2011 time period, and clicking it will reveal all timeline units in the 2011 time period.

Figure 2F:
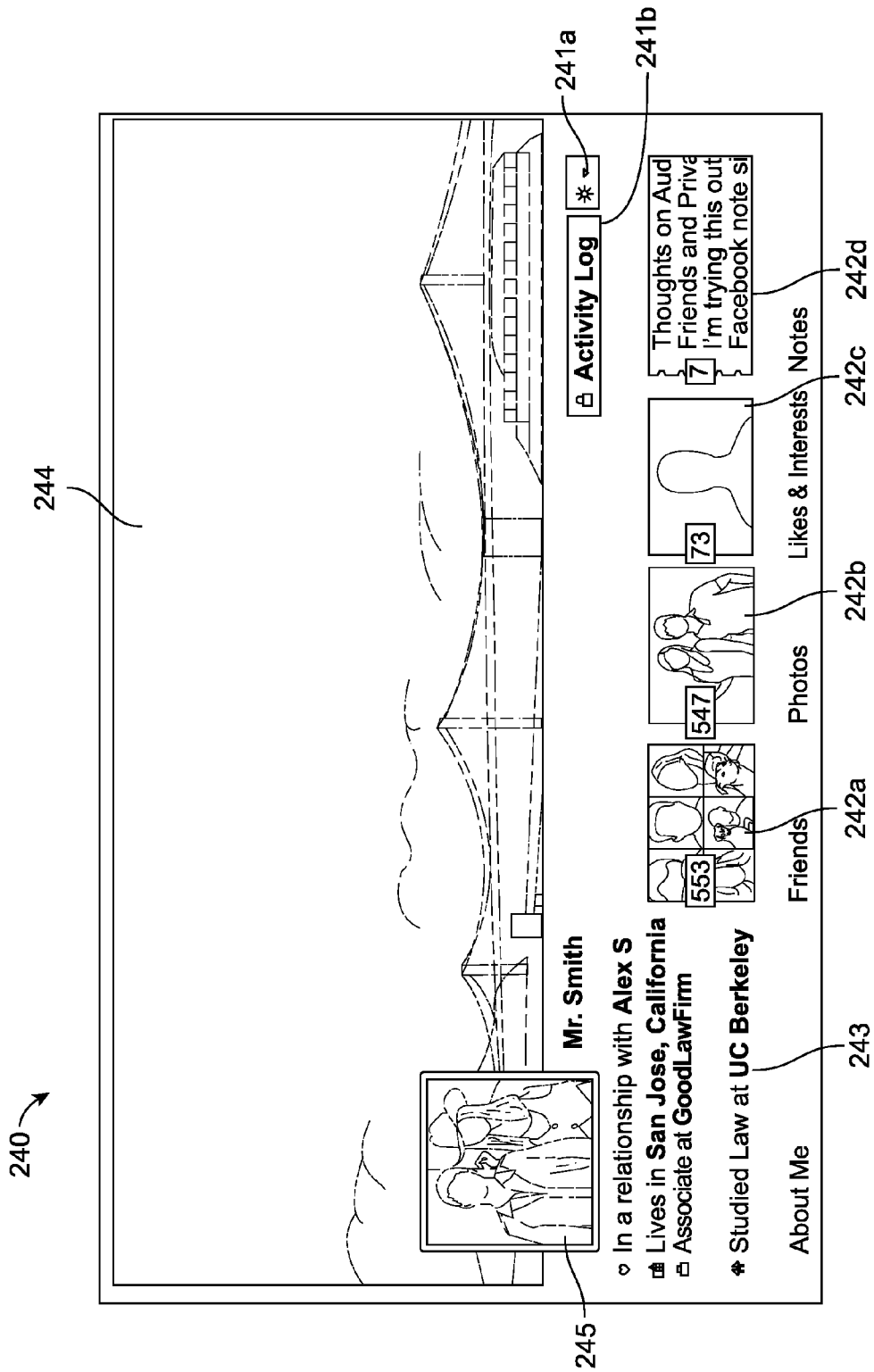
Figure 2H:
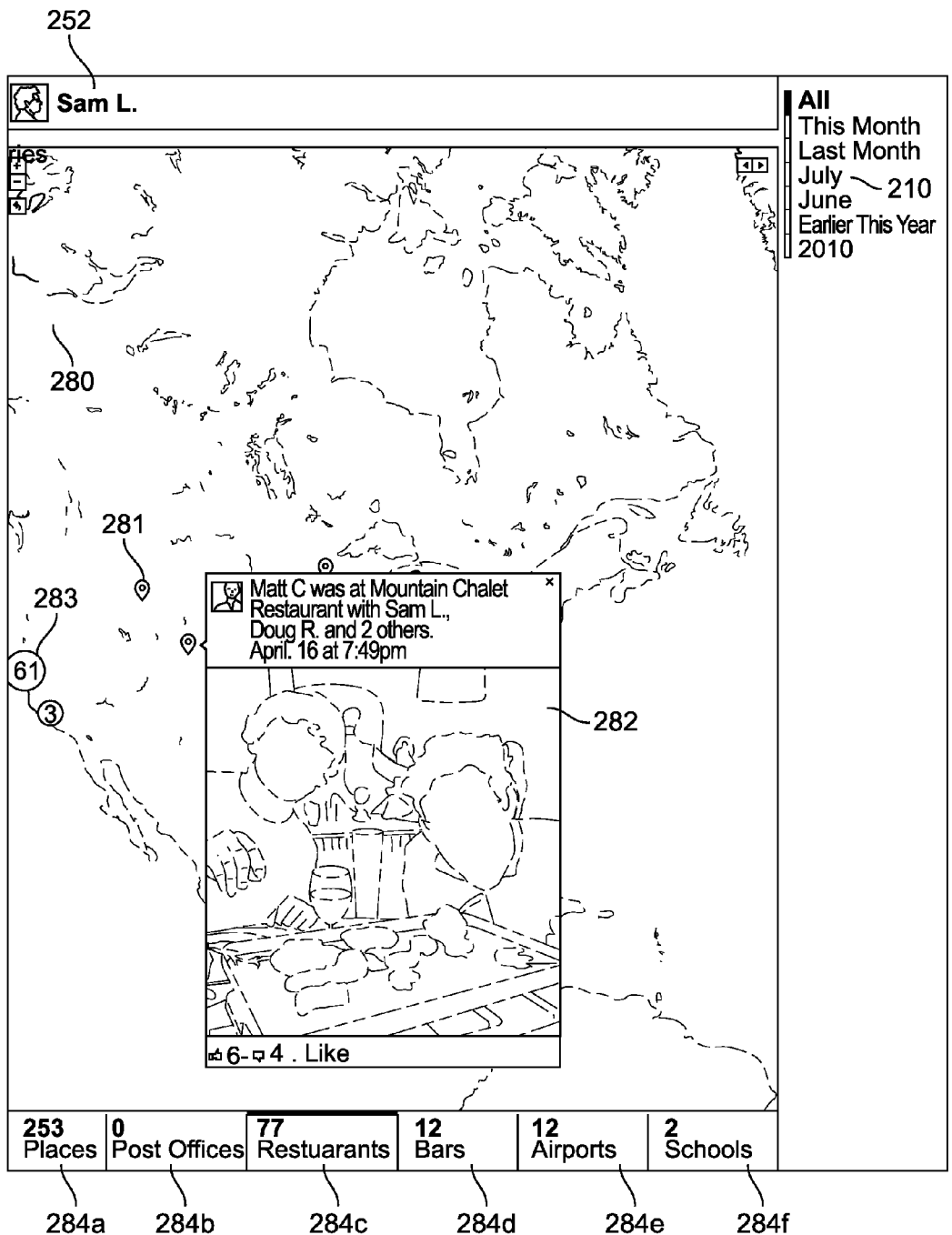

The title box 240 illustrated in FIG. 2F is an interface component that may include option buttons 241, dynamic thumbnails 242, user details box 243, dynamic cover photo 244 and profile photo 245. The title box 240 allows users to adjust their social networking system settings and personalize their timeline.

The option buttons 241 enable the user to adjust various preferences associated with a social networking system account, perform actions associated with the account, and view and edit detailed feeds of information available to them. The options, actions and details available to a user through the option buttons 241 may vary based on whether the user is a subject user (i.e. the account-holder for that profile/account) or a viewing user (i.e. someone who is not the account-holder). For a subject user option examples include a settings button 241a that allows users to adjust their timeline settings, an activity log button 241b that allows users to access a complete list of all their activities on the social networking system 100, and an edit profile button that allows them to modify personal details such as their profile photo, cover photo, biography etc. For viewing users options may include buttons for messaging, "friending", "de-friending", muting, reporting, etc. Accessing the activity log may give users access to a complete list of all the timeline units, activities and user data that has been collected/generated by the social networking system 100. The activity log may also enable users to indicate individual timeline units, activities, or user data to hide/show/maximize on the timeline 220. In this way the activity log enables users to curate their raw data.

FIG. 2G illustrates one embodiment of an activity log that may be accessed by a user through the activity log button 241b. The activity log includes time period navigation headers 273 that indicate the time period for the displayed activities and enable users to jump to the activities of a specific date. The activity log also includes activity entries 276 that give users information about a particular activity captured by the social networking system 100. The activity entries 276 may include a time, a date, a text description of the action (e.g. "Jill added a comment"), and a thumbnail or other data summary. The activity log may also have date separators 277 that separate the activities of one time period from another time period. The more activity link 278 allows the user to view more activities in a particular time period if all of those activities are not displayed on the user's screen. The activity filter 274 allows users to filter the activity log to display only activities of a particular type. For example, a user can filter the activity log to show only photo-related activities, or activities related to a specific third-party social application. Each activity entry 276 may also have an activity options menu 275 that enables users to perform various functions such as hiding the activity from the timeline, allowing the activity on the timeline, featuring the activity (starring) on the timeline, etc. These functions may be performed individually on activities or they may be performed on groups of activities on the basis of location, activity type, or the users associated with the activity. The activity options menu 275 may also allow the user to set privacy options for that activity to restrict who is allowed to view that activity material. In addition, the activity options menu 275 may enable users to change the date associated with the activity. For example, a user may be able to change the date of a photo that the user posted from the upload date to some date associated with the event that the photo was taken. Similarly the activity options menu 275 may enable users to associate a location with an activity or to change a location that is already associated with that activity.

The dynamic thumbnails 242, illustrated in FIG. 2F, are dynamic interface elements that serve as links to various user information feeds such as friends (242a), photos (242b), likes & interests (242c), and notes (242d). Dynamic thumbnails may also be provided for third party application feeds, user-defined feeds, social group feeds, etc. The order that is used to display the dynamic thumbnails 242 may be determined based on the viewing user's browsing history or preferences, or the subject user's browsing history or preferences. The order may also be determined by using a machine-learned ranking algorithm that determines the order of the dynamic thumbnails 242 based on user preferences, social signals, recent views, etc. The rating of a third-party application may be used as a factor that helps to determine that third-party application's dynamic thumbnail position in the list of dynamic thumbnails.

The dynamic thumbnails not only allow users to click on them to navigate to information, but also themselves act as small windows into the user's data. Each dynamic thumbnail displays a dynamic visual summary of the information feed that it links to. For example, the friends dynamic thumbnail 242a displays a small collage of the user's friends' profile photos, as well as a numerical statistic showing the number of friends the user has (in this case 553). Similarly the photo dynamic thumbnail 242b shows a recent photo that the user was tagged in, as well as a statistic indicating the total number of photos that the user was tagged in (in this case 547). The content in the thumbnail and the statistics can change in real-time based on information collected by the social networking system 100. The dynamic thumbnails 242 may use the services of a ranking process (for example, a machine-learned scoring/ranking process as described in more detail herein) to determine the most relevant and interesting data to use in the dynamic summary. Each type of dynamic thumbnail 242 may use a different ranking methodology to determine the content (e.g. images) to display. For example, the photos dynamic thumbnail 242a may display a collage consisting of the user's "best" photos based on a machine-learned algorithms ranking of the user's photos based on factors such as photo views, comments, likes etc. The ranking methodology can take into account the newness of recently added photos to place them higher in the photo ranking, and thus more likely to be displayed in the dynamic thumbnail 242. As the user posts more photographs to the social networking system 100, the photos dynamic thumbnail 242a may update the collage of photos displayed to include the newest photos posted.

The timeline manager 119 may enable a user to display alternative "views" of the timeline by clicking a dynamic thumbnail 242, or by clicking another option or link. These views can be used to present users with a timeline 220 containing timeline units of a particular type. For example, a "Photo" view of the timeline 220 would present a timeline containing only timeline units that have photos. Other views can present a user with an entirely customized view of the timeline 220 that is appropriate for a particular data type.

FIG. 2H illustrates a "map view" of the timeline. In this "map view" the timeline 220 is replaced by a timeline map 280. The timeline map 280 includes a displayed map location and map markers 281 that indicate the locations associated with timeline units in the current displayed time period. When the user interacts with a map marker 281 (for example by clicking it) a timeline unit pop-up 282 may be shown which shows information about that timeline unit. In this example the pop-up 282 shows a picture from the timeline unit and social data about the number of comments and "likes" on that timeline unit. The pop-up 282 may allow a user to comment on or "like" the timeline unit at that location. If a location has more than one timeline unit associated with it, or if the timeline map 280 is zoomed out so that timeline units with distinct locations overlap, then multiple timeline units will be shown via a single map marker called a timeline map group marker 283. The timeline map group marker 283 has a numerical indicator on it showing the number of timeline units at that location (e.g. in this case 61). If a user zooms in the timeline map 280 such that the locations of the timeline units no longer overlap, then the timeline map group marker 283 will resolve itself into individual map markers 281 that indicate the locations of the individual timeline units on the zoomed in map. Similarly if the timeline map 280 is zoomed out such that the locations of the map markers 281 begin to overlap again, the map markers will be replaced by a single timeline map group marker 283 with a numerical indicator reflecting the number of timeline units at that location. If the timeline map 280 is zoomed out even further, multiple timeline map group markers 283 may be combined into a single timeline map group marker 283. The scale of the timeline map group marker 283 may be increased to reflect the number of timeline units represented by it. For example, in the example illustrated in FIG. 2H the group marker associated with 63 timeline units is much larger than the one associated with 3 timeline units. When a user clicks the timeline map group marker 283 a group pop-up may be displayed that is similar to the pop-up 282. The group pop-up may display the group of timeline units at the location of the timeline map group marker 283, or the group pop-up may display only a single timeline unit from that location along with left and right arrows that allow the user to scroll between all the timeline units at the location.

The timeline filter tabs 284 enable users to filter the timeline units shown on the timeline map 280 based on various filtering criteria, such as in the illustrated example, by timeline unit type. The timeline units may also be filtered by other criteria such as by the users associated with the timeline units, time, location, etc. In the illustrated example, each timeline filter tab 284 displays statistics about the numbers of the corresponding type of timeline unit visible in the current time period. For example, in this illustration, the "Places" tab 284a shows that there are 253 "places" timeline units in the currently selected time period. Filters based on other criteria may display other statistics.

As in other timeline views, in the timeline map 280 a user can change the currently viewed time period using the time period selector 210. This can be considered a form of timeline unit filtering, where the filtering of the timeline units is done by time, instead of by some other criteria. When a different time period is selected by the user, the timeline map 280 will show map markers for timeline units from the newly selected time period. The timeline map 280 may also scroll to a new location, or center on a new location based on the locations of the timeline units in the currently selected time period. The timeline map 280 may also have controls that allow a user to manually zoom, pan, and rotate the map view.

In one embodiment the timeline map 280 presents a map view of a joint timeline for multiple subject users (a joint timeline map). The generation of timeline units for a joint timeline is discussed in more detail herein. The timeline map 280 may treat timeline units that are generated for multiple subject users in a manner that is analogous to the way it treats timeline units generated for one subject user. In the case of multiple subject users, the timeline filter tabs 284 may have a tab for each subject user to enable filtering of the timeline view by each subject user. The statistics displayed on each timeline filter tab 284, in this example, may be based on the number of timeline units related to that subject user.

In one embodiment the timeline map 280 enables users to create a new timeline unit associated with a location by selecting the corresponding location on the timeline map 280 and entering data for an event linked with that location. For example, the timeline map 280 may open an event data entry interface 262 (as illustrated in FIG. 2D) when a user clicks a location on the timeline map 280. Entering data into the event data entry interface 262 sends new structured data to the social networking system 100 that can be used to create a timeline unit associated with that location.

In one embodiment the timeline map 280 may show generic stories instead of timeline units. Generic stories are discussed in more detail herein. When a timeline map 280 displays generic stories instead of timeline units, it may be called a "map view", "story map" or just a map. A story map behaves in a manner analogous to a timeline map 280, except that instead of timeline units, the map markers show the locations of generic stories, the filtering tabs operate to filter the stories instead of timeline units, and the story map enables users to create new stories associated with locations instead of new timeline units associated with locations.

The user details box 243, illustrated in FIG. 2F, contains a summary of the most relevant information about the user such as relationship status, employer, location, etc. This information may be provided by the user explicitly, or it may be deduced from unstructured information collected by the social networking system 100.

The dynamic cover photo 244, illustrated in FIG. 2F, is another dynamic interface element. The dynamic cover photo 244 includes an image that is selected by the subject user to personalize their timeline. The dynamic cover photo 244 may have several different render states. Each render state may be visually different. In the simplest embodiment the dynamic cover photo 244 has a maximized state where the entire photo is visible, and a minimized state where the photo is only partially visible (e.g. the picture may scroll up to occupy less of the screen). The different render states may be activated based on who the viewing user is, what that viewing user's social network browsing history is, the duration the state has already been active, the rating/relevancy of the dynamic cover photo content, the viewing user's screen size, or other factors. For example, the dynamic cover photo 244 may be displayed in its maximized render state (or, full size) when a viewing user views the dynamic cover photo 244 for the first time, and then on subsequent views of the cover photo the photo may be displayed in its minimized render state (e.g., scrolled up). The image displayed in the dynamic cover photo 244 may have the capability to shrink or expand to fill the space available in the interface for the dynamic cover photo 244. As the display properties change, the image may change its scaling to fill the available area. For example, the image will be able to fill the dynamic cover photo 244 area if the title box 240 is displayed in either landscape or portrait mode on a mobile device.

The profile photo 245 is selected by the subject user and may be used whenever an image representation of the user is necessary in the social networking system 100. For example, the profile photo 245 of the subject user is displayed on the timeline interface 200 via the title box 240, but it may also be displayed on timeline units 230 that contain narrative data posted by the subject user.

In one embodiment, when a user selects a time period in the past to view, the profile photo 245, users details box 243, and/or dynamic cover photo 244 may change the data they display to reflect the subject user's historical data (e.g. their profile photo at that time in the past, their relationship status at that time in the past, etc.).

The timeline interface 200 is sent via the network 310 to the client device 105 of the viewing user, and is displayed via the user interface 130. If the viewing user selects a new time period from the time period selector 210, the timeline manager will generate or select new timeline units from the newly selected time period. The new timeline units are then sent to the viewing user's client device 105 for presentation in the timeline interface 200 at an appropriate position on the timeline 220.

In one embodiment, the timeline 220 is a single chronologically ordered continuum which contains every selectable time period in order. In this embodiment, selecting a time period from the time period selector 210 causes the timeline 220 to scroll to the selected time period in the continuum. In another embodiment the timeline 220 shows only one time period at a time, and selecting a new time period from the time period selector 210 causes a new time period to be shown on the timeline 220.

In one embodiment of the invention, the timeline manager 119 chooses timeline units for presentation in the timeline 220 based on a timeline unit ranking produced by the timeline unit ranker 125 for the subject user. In another variation, the timeline units selected by the timeline manager 119, which may have been selected using a ranking produced by the timeline unit ranker 125, are curated by the subject user to reflect his or her preference regarding what timeline units to present to viewing users. Once the timeline manager has determined what timeline units to show in the subject user's currently selected time period, the user interface manager 115 presents the timeline 220 in the timeline interface 200 to the viewing users through the user interface 130. In an alternative embodiment the timeline unit ranking is produced by the timeline unit ranker 125 for the viewing user instead of the subject user. In this embodiment, the viewing user may be allowed to curate the subject user's timeline 220 to reflect his or her preferences regarding what timeline units to view. For example, if Bob is viewing the timeline for Jim, the social networking system 100 may give Bob the ability to hide and show timeline units on Jim's timeline, and then this curation data may be used subsequently so that Bob can be presented with a timeline consisting of Jim's timeline units selected with Bob's preference in mind.

Once the timeline manager 119 has selected timeline units 230 for presentation in the timeline 220 it may highlight the timeline units 230 based on their ranking. For example, the timeline manager 119 may emphasize timeline units that are highly ranked by the timeline unit ranker 125, by presenting these highly ranked timeline units more prominently compared to timeline units ranked lower. Timeline units ranked higher may be presented more prominently compared to timeline units ranked lower by displaying them, for example, using a larger size, outline, different text color, font, text size, background color, etc. One example of this is the "starred" displayed timeline unit 230c illustrated in FIG. 2C, which is displayed with double the width of other displayed timeline units 230.

For a given time period, the timeline manager 119 may display only a subset of the timeline units available for that time period in order to limit the crowding of the timeline 220; when only a subset of timeline units are displayed, the timeline manager 119 will attempt to select the most appropriate timeline units for display based on user curation and/or ranking, or some other methodology.

User Curation

The social networking system 100 may allow users to curate their own narrative data (this includes the user data objects 175 in the user data store 350, and the actions 181 in the action log 351). As curators, users are given the power to highlight narrative data they like and to remove or hide narrative data they dislike. In order to enable user-driven curation, the user interface manager 115 may give users the option of hiding or removing timeline units, by hiding or removing the visual representations of those timeline units through the user interface 130. The timeline interface 200 may have a method of individually removing the unwanted timeline units, such as the "hide from timeline" option in the timeline unit menu 232b illustrated in FIG. 2B, but the user interface 130 may also use another interface to allow users to indicate unwanted timeline units either individually or collectively by action category, by data type, by actor, or by some other attribute associated with timeline units. The timeline interface 200 may also give users the ability to indicate that a timeline unit is important to them, and that they want it to be preferred over other timeline units. The timeline interface 200 may have a method of individually marking the visual representations of timeline units as "important" or "liked," such as the "star" button 231b or a "pin" button, or the user interface 130 may use another interface to allow users to indicate preferred timeline units, either individually or collectively.

The social networking system 100 may, as a matter of policy, allow only the subject user to curate the timeline units displayed on his or her timeline 220, or the social networking system 100 may allow viewing users to curate their view of a subject user's timeline 220. The timeline manager 119 may also allow both the subject user and viewing users to curate the subject user's timeline 220. In a different embodiment the timeline manager 119 may ignore user curation altogether and select timeline units on the basis of some other criteria (including or excluding the ranking information from the timeline unit ranker 125).

Timeline Unit Generation and Ranking

Figure 4:
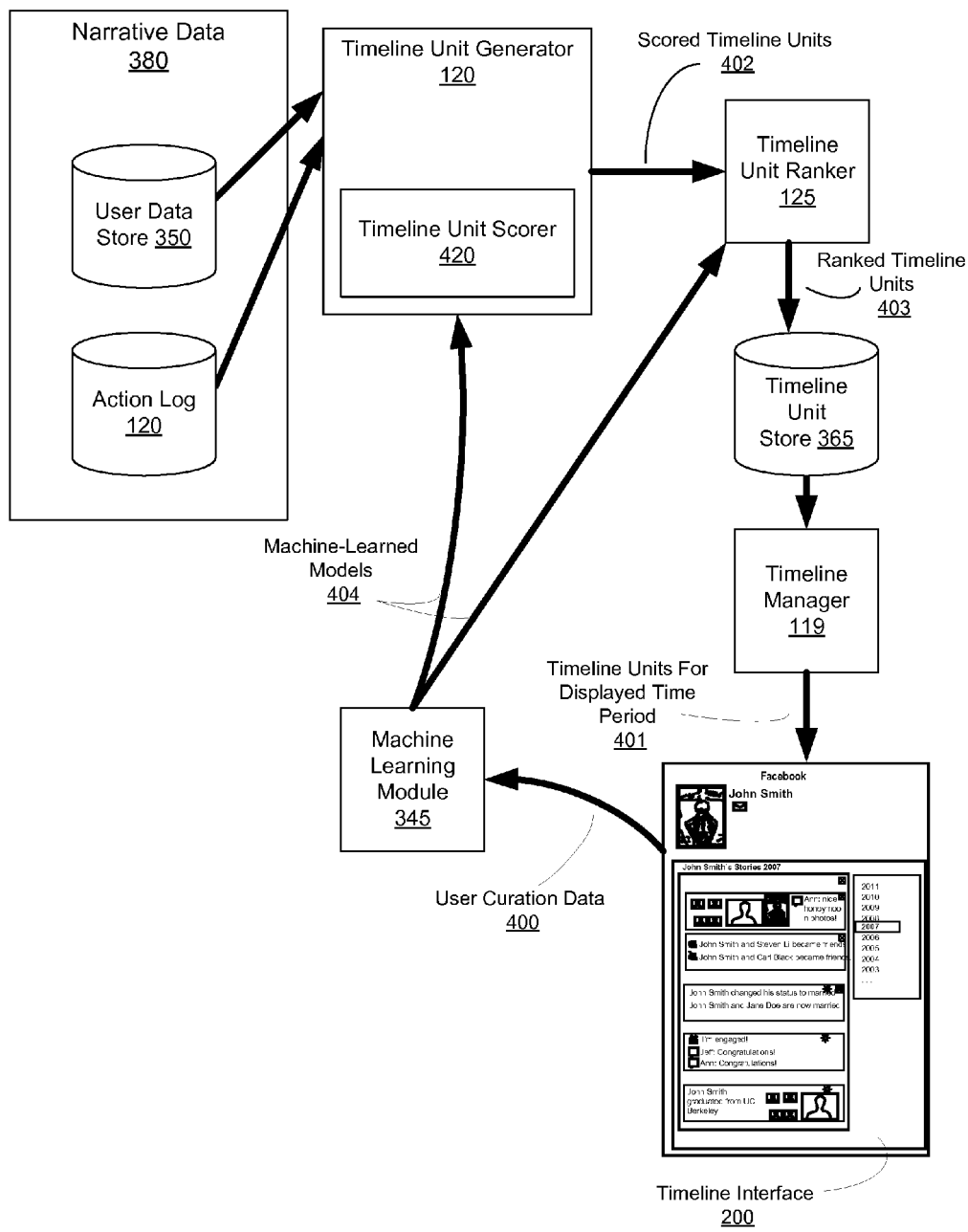
FIG. 4 is a data flow diagram illustrating the interactions between various modules in the social networking system for generating and ranking timeline units, in accordance with an embodiment of the invention.

FIG. 4 illustrates one embodiment of a process for generating and ranking timeline units in a social networking system 100. In this embodiment, narrative data such as user data from the user data store 350 and information about user actions from the action log 351 are used by the timeline unit generator 120 to generate timeline units 180 for display in the timeline 220. Each timeline unit generated by the timeline unit generator 120 includes information about the narrative data that timeline unit represents, and may also include a score generated by the timeline unit scorer 420. In one embodiment, the timeline unit generator 120 only generates the quantity of timeline units necessary to fill each time period on the timeline 220. In another variation, the timeline unit generator 120 may generate more timeline units 230 than are necessary to fill each time period on the timeline 220, so that if a downstream process—such as a privacy process—hides one or more timeline units from the timeline 220, there will be extra timeline units that can be displayed to fill the vacancies.

In one embodiment the timeline unit generator 120, when generating timeline units for a particular time period, may select the most interesting or relevant narrative data, from the point of view of the subject user, for that time period, and generates timeline units for only that narrative data. In another embodiment the relevance of the narrative data is determined from the point of view of the viewing user instead of the subject user, or both the viewing user and subject user together.

The timeline unit generator may determine how interesting or relevant narrative data is based on social networking data such as user "likes", number of comments on the item, views of the item, affinity, etc. The determination of the most interesting and relevant narrative data may also take into account the time period for which the timeline unit is being generated. For example, a photo associated with a time in a time period in which the user does not have many other photos may be considered more interesting and relevant than a similar photo from a time period that has many photos associated with it. The determination of the most interesting and relevant narrative data may also take into account the preferences of the subject user and/or the viewing user.

In an embodiment, the timeline unit generator 120 uses machine-learned models—generated by the machine-learning module 345—to determine the most interesting and relevant narrative data based. In another embodiment, the timeline unit generator 120 uses a rule-based system to determine the most interesting and relevant narrative data, where the rules are programmed manually. In yet another embodiment, the timeline unit generator 120 determines the narrative data to use in timeline unit generation by collecting feedback (such as through user curation) from the subject user, the viewing users, or both. The timeline unit generator may also use any combination of the above mentioned techniques together to select narrative data for the generation of timeline units. In another embodiment, the timeline unit generator 120 may generate timeline units for a particular time period using all the narrative data, without taking into account relevance at all.

In one embodiment the timeline unit generator 120 generates timeline units associated with a single subject user by selecting only narrative data that is related to that single subject user, e.g. photos containing the subject user, posts about the subject user, events attended by the subject user, etc. These timeline units can be used to generate a timeline for the single subject user.

In another embodiment the timeline unit generator 120 generates timeline units associated with two or more subject users in a "common timeline group" by selecting narrative data that is related to all the subject users in the common timeline group, e.g. photos containing all the subject users, comment threads containing comments by all the subject users, events attended by all the subject users, etc. These timeline units can be used to generate a common timeline for all the subject users in the common timeline group. In another embodiment a common timeline can be constructed for multiple subject users by simply selecting timeline units that were generated for the individual subject users and displaying them on a single timeline. The generated common timeline can be provided to viewing users that request a common timeline interface for the common timeline group. The common timeline gives a unified view of the social networking system history of the subject users in the common timeline group. For example, Jill can select an option to view a joint common timeline for several of her classmates, Bob, Jim, and John, at once. The social networking system 100 will then select timeline units that are generated from the common narrative data of Bob, Jim, and John, and will send these timeline units for display on Jill's client device. Systems and methods for displaying an intersection between users of a social networking system are disclosed in U.S. application Ser. No. 13/087,672, filed on Apr. 15, 2011, which is incorporated by reference in its entirety.

The timeline units generated by the timeline unit generator 120 may have different types based on the type of content they contain and/or the informational purpose they serve. For instance, some timeline units may be designed to display information concerning a particular event. For example, there may be distinct timeline unit types designed to display information about job changes, trips, weddings, birthdays, film viewings etc. Some timeline units may be designed for the purpose of displaying aggregate groups of data of various types. For example, there may be timeline unit types for aggregating photos, videos, or music from a particular time period or event (e.g. a photo report for a time period). Other timeline units may be used to display information related to actions performed by users of the social networking system. For example, there may be timeline units designed to display information about the connections made by a user in a particular time period—e.g. a timeline unit may display the friends that a user made in a particular time period (i.e. a friends report).

The different timeline unit types will arrange the data they contain in a manner that is informative to the viewing user and aesthetically pleasing. Since the timeline units are intended to give a summary of the narrative data they represent, they will not necessarily display all of the narrative data they are generated to represent. The visual representations of the timeline units may display information summary elements in order to present users with a compact and informative summary of narrative data. Information summary elements include image thumbnails (which act as image summaries), text extracts (which act as textual comment summaries), frame captures and GIF animations (which act as video summaries), statistical summaries (numbers that provide information on the narrative data), etc. These information summary elements may be generated from the most relevant or interesting narrative data in order to present users with the most compelling summaries. For example, a timeline unit may be generated for a photo album, and the information summary elements displayed on it may include thumbnails of the three most popular photos in photo album, as well as a displayed number that indicates the number of photos in the album.

The information summary elements may be updated dynamically as the underlying narrative data changes. The visual representations of the timeline units may also include navigation aids that provide users with a convenient method of obtaining more information about specific narrative data that interests them. These navigation aids include elements like web links, tabs, and buttons. An element in a displayed timeline unit may be both an information summary element and a navigation aid. For example, the visual representation of a timeline unit may contain a set of photo thumbnails representing images from a subject user's photo album, where each thumbnail is also a link that can be clicked to navigate to the photo album itself and to view other photos in the album.

The timeline unit scorer 420 produces a score for each generated timeline unit that corresponds to the relevance of that timeline unit to the subject user(s) and/or viewing users. The timeline unit scorer 420 may use machine-learned models to produce the score for each generated timeline unit. These machine-learned models are produced by the machine-learning module 345. In one embodiment, the machine-learned models use machine-learning techniques to evaluate timeline units against other timeline units of similar type. For example, timeline units containing photos are compared against other timeline units containing photos, not against timeline units containing links and text. In order to evaluate the relevance of timeline units, the machine-learned models may use as input various features of the narrative data represented in the timeline units. These features may include social data signals such as user "likes" (e.g. activation of a thumbs-up or like button), user comments, user tags, user views, user affinity etc., but they may also include other signals such as image features, video features, textual features, etc.

The generated timeline units with scores 402 outputted by the timeline unit generator 120 are processed by the timeline unit ranker 125 to produce a ranking of timeline units. In order to place timeline units of different types into one uniform ranking, the timeline unit ranker 125 normalizes scores across different timeline unit types. The normalization process can be used to weight certain timeline unit types to increase or decrease their rank. For example, the social networking system 100 may, because viewers often prefer photos over text, give additional weight to timeline units that contain photos while reducing the weight of timeline units that predominantly contain text. The weightings and the details of the normalization process can be adjusted based on the needs of the social networking system 100. For example, the normalization process can be configured for a particular user or a specific demographic to account for tastes and preferences. In one embodiment, the timeline unit ranker 125 uses machine-learned models to determine the appropriate weighting for each timeline unit type. These machine-learned models are produced by the machine-learning module 345. In order to determine a weighting for each timeline unit type, the machine-learned models may look at various features and social data signals associated with these timeline unit types. These feature and signals include user "likes", user comments, user views, user affinity etc., and may also include features from the underlying narrative data included in these timeline unit types.

Once the timeline units are normalized, the timeline ranker 125 will create a ranking based on the normalized scores. The ranked timeline units 403 may be stored in the timeline unit store 365, or they may be selected directly by the timeline manager 119 for display in the timeline 220 in the timeline interface 200.

In one embodiment, after ranking the timeline units, the timeline unit ranker 125 may attempt to remove duplicate narrative data that appears in multiple timeline units (de-duplication). In a simple embodiment, when the timeline unit ranker 125 detects two timeline units containing the same action or user data, the timeline unit ranker 125 will eliminate the timeline unit with the lower score. This avoids the situation where, for example, the same photo or comment shows up in two or more timeline units. In a more sophisticated embodiment, when the timeline unit ranker 125 detects two timeline units containing the same narrative data, the timeline unit ranker 125 will attempt to remove only the narrative data that is duplicated, from the timeline unit with the lower score. This process may require the timeline unit ranker 125 to do further analysis to determine if the removal of the duplicated narrative data renders a timeline unit "uninteresting" or invalid. For example, if a timeline unit contains only a single photo and a comment referring to that photo, then the removal of the comment may not make the timeline unit uninteresting, since viewers may enjoy looking at single photos even without comments. However, in this example if the duplicated material is the photo, then the removal of the photo may render the timeline unit uninteresting, since a comment referring to the photo is not interesting without the photo itself.

In one embodiment, when the timeline manager 119 is selecting timeline units for display in the timeline interface, timeline unit ranker 125 may implement a diversification process to ensure that there is a diversity of different timeline unit types in the timeline 220. Such a diversification process is used to ensure that a single timeline 220 is not filled with an excess of a single timeline unit type, which is a monotonous outcome. For example, without a diversification process, it is possible that the top ten timeline units for a time period are all predominantly photo timeline units. This would lead to a timeline 220 which would have mostly photos and little else (a monotonous selection). To prevent such an outcome the timeline unit ranker 125 will use a variety of methods to ensure diversity in the timeline units selected by the timeline manager 119. One such method is to allow only a certain number of each timeline unit type to be selected for display in a time period. Another method is to negatively weight timeline units of a given type once a certain number of other timeline units of the same type have already been selected for display in a time period. In one embodiment, the diversification process may be done earlier, when the timeline units are ranked and stored in the timeline unit store 365. Diversification may be varied based on the demographic of the viewing user, the subject user, or both.

In one embodiment, the timeline manager 119 may allow users to select particular "views" of the timeline 220 that are biased to show many more of one type of timeline unit, or exclusively one type of timeline unit. The timeline manager 119 may achieve this by simply weighting the score of timeline units of a particular type higher so that all, or more, of those timeline units are selected for display in the timeline 220. For example, if a user selects a "Photos" view of the timeline 220, the timeline manager 119 may score timeline units that contain photos much more than other types of timeline units, so that the timeline units with photos are displayed on the timeline 220.

Machine-Learning Module

The machine-learning module 345 generates machine-learned models 404 for use by the timeline unit scorer 420 and the timeline unit generator 120, the timeline unit ranker 125, and for ranking content for relevance as required by various components of the timeline interface. For example, the machine-learned models can be used by the timeline manager 119 to determine the most relevant photos to display in a Photo report for a particular time period. The machine-learned models generated by the machine-learning module 345 include tree-based models, kernel methods, neural networks, splines, and combinations of one or more of these techniques. The machine-learning module 345 may also use other machine-learned methods or statistical methods to generate models.

In one embodiment, the machine-learning module 345 takes user curation data 400 collected from the timeline interface 200 and uses this information to improve machine-learned models 404 that are used by the other modules. The user curation data may include not only the explicit preference data such as data about which timeline units have been hidden, muted, deleted, starred, liked or promoted by the subject user, but may also include implicitly collected social data such as information about which timeline units have been viewed, expanded, linked, commented on, etc. This user curation data, both implicit and explicit, may be used by the machine-learning module 345 as training data to improve machine-learned models that may then be used by the other modules. For example, a trained machine-learned model from the machine-learning module 345 may be used by the timeline unit ranker 125 to determine the weighting that should be given to timeline units of various types during the score normalization process. Another trained machine-learned model may be used by the timeline unit scorer 420 to generate timeline unit scores. Yet another trained machine-learned model may be used by the timeline unit generator 120 to determine the most interesting or relevant narrative data for generation of timeline units.

The machine-learning module 345 may generate a single set of machine-learned models, which captures the preferences of the entire user base of the social networking system 100, or the machine-learning module 345 may be used to generate separate sets of machine-learned models for subsets of the user base of the social networking system 100 (e.g. a different set of models for people in different age ranges). The machine-learning module 345 may also be used to generate a distinct set of machine-learned models to capture the preferences of each individual user of the social networking system 100.

Timeline Unit Generation Process

Figure 5A:
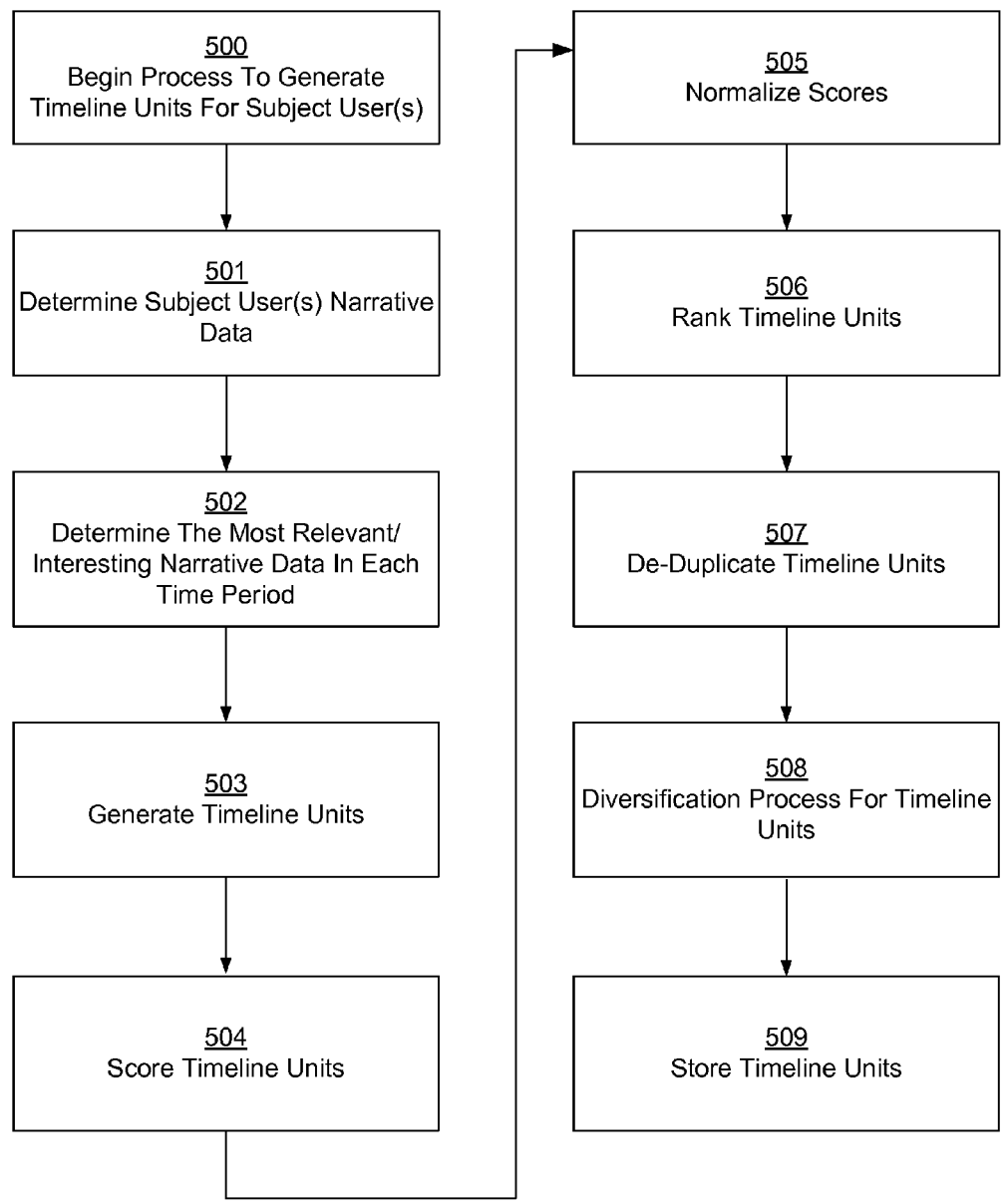
FIG. 5A illustrates a process for generating and ranking timeline units, in accordance with an embodiment of the invention.
Figure 5B:
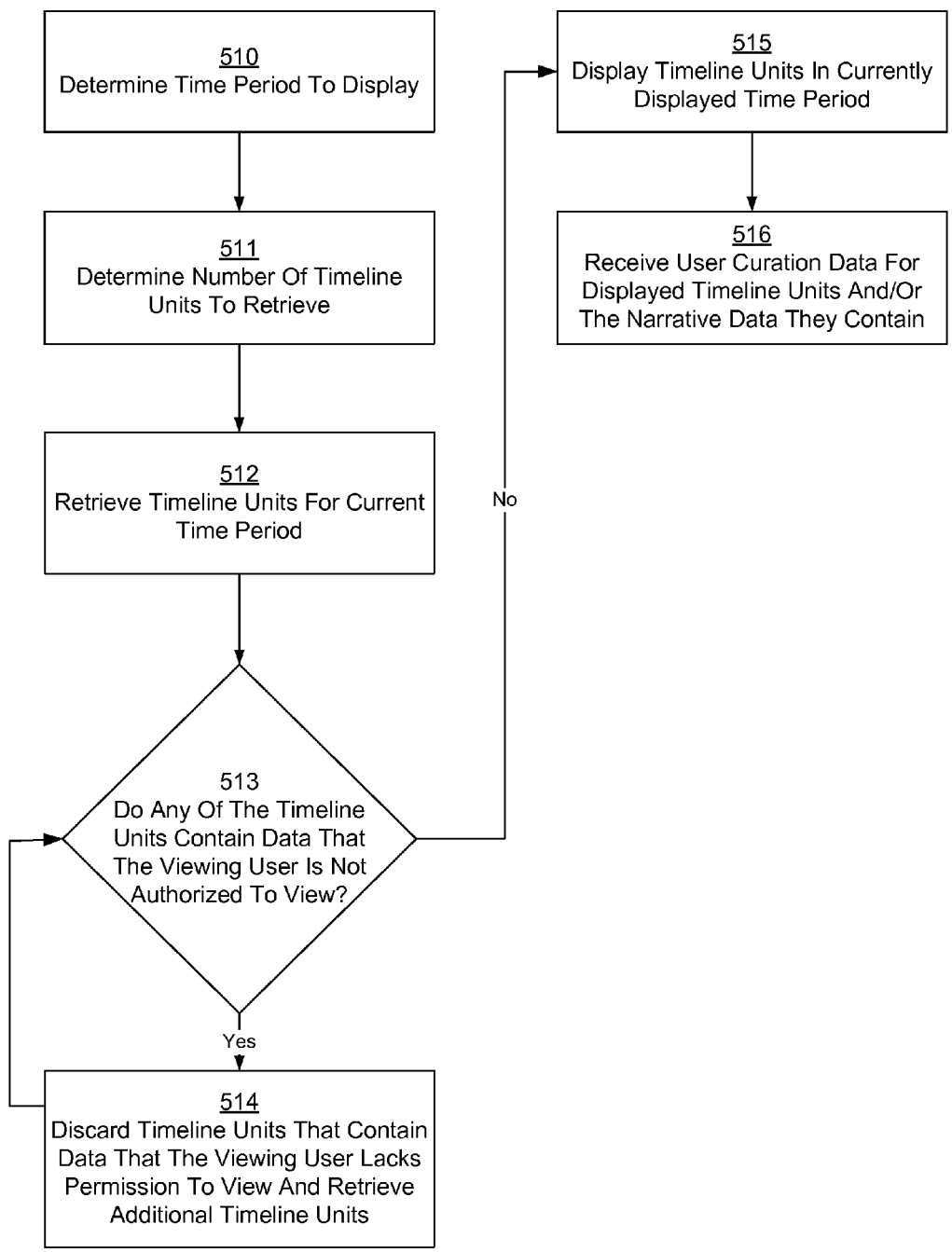
FIG. 5B illustrates a process for generating timeline units and collecting user curation data, in accordance with an embodiment of the invention.

FIG. 5A and FIG. 5B illustrate one embodiment of a process for generating, ranking, and displaying timeline units in a social networking system 100. As a first step the social networking system begins 500 a process for generating timeline units for the subject user(s). This process may be initiated periodically to continuously generate new and updated timeline units for users of the social networking system, or it may be initiated in response to an event, such as an attempt by a viewing user to access the timeline of a subject user. Once the process is begun, the timeline unit generator will determine 501 the narrative data related to the subject user(s). The relevant narrative data may already be associated with the subject user(s) in a database, or it may be discovered by processing actions and user data in the action log and user data store to discover associations and links between the subject user(s) and various data. For example, a photo may be determined to be narrative data relevant to a subject user based upon a caption that contains the subject user's name that is associated with that photo. Similarly, actions where the subject user(s) is/are one of the actors may also be determined to be relevant narrative data.

Once the narrative data is identified, the timeline unit generator will determine 502 the most interesting and relevant items from this narrative data to use in timeline unit generation for each time period. The determination of the most relevant and interesting narrative data may be accomplished using a machine-learned model, as described in previous sections, or it may employ some other method. In some embodiments, user curation of data, from later stages in the process, can be fed back into the machine-learned models to improve the process of determining 502 the most relevant/interesting narrative data.

In one embodiment the timeline manager 119 takes into account the privacy settings of the subject user and the viewing user to determine the items of narrative data that the viewing user has permission to view. If the viewing user does not have permission to view certain items of narrative data, those items of narrative data will not be used in the generation of timeline units. In a different embodiment there is no privacy check at this stage of the process, and instead the privacy process operates on generated timeline units, prior to selection, as described herein.

Once the narrative data is identified and selected, timeline units are generated 503 and scored 504. The scoring 504 of timeline units may also employ machine-learned models. These models can be the same as the machine-learned models used to evaluate the narrative data or they may be separate models. Once the timeline units are scored, the scores are normalized 505 by timeline unit type as described in previous sections. This normalization process may be used to weight certain timeline unit types so that they are preferentially treated by downstream processes for the purposes of ranking and selection. The weights used for each timeline unit type in the normalization process may be produced by a machine-learned model.

The normalized timeline units are then ranked by score 506 and de-duplicated 507 to remove repetitious data. The de-duplication process may involve simply removing the lower ranked timeline units that have repetitious data, or it may involve selectively removing only the repetitious narrative data from lower ranked timeline units.

Once the timeline units have been ranked 506 and de-duplicated 507, there may be a diversification process 508 to ensure that there is sufficient variety of timeline units in the timeline unit ranking for each time period. Diversification of timeline units may be accomplished in many different ways. The timeline units may be diversified 508 after ranking 506 and de-duplication 507 as illustrated in FIG. 5A, by penalizing the score of timeline unit types that are overrepresented in the timeline unit rankings for a time period, and boosting the score of timeline unit types that are underrepresented. In the embodiment illustrated in FIG. 5A, after diversification 508 the timeline units are stored 509 so that they may be retrieved and displayed at a later time. In another embodiment the timeline units are selected for display immediately after diversification, bypassing the storage step.

In a different embodiment, the diversification 508 may also be accomplished later in the process when the timeline units are retrieved for display in a particular time period. In this latter process the timeline units are diversified as they are selected from the timeline unit store 365 by monitoring what timeline unit types have already been selected from the store, and preferentially selecting other types of timeline units as necessary. This latter process for diversifying timeline units is especially useful when the time period duration is user-defined as opposed to fixed by the timeline manager 119.

FIG. 5B illustrates one embodiment of a process for retrieving and displaying timeline units in a social networking system 100. The process is initiated when a viewing user requests a timeline interface for the subject user(s). The timeline manager determines 510 the time period to display. The timeline interface may use a variety of graphical user interfaces to allow viewing users to indicate the time period of the subject user(s) data they wish to view. In a simple embodiment the viewing user is given a list of predetermined time periods to choose from. In a more flexible embodiment the viewing user is given the ability to choose the start and end of the time period they wish to view. If the viewing user has not selected a time period to display, the timeline manager may display a timeline interface using a default time period, for example, the latest time period.

Once the bounds of the time period are determined, the timeline manager will determine 511 the number of timeline units to retrieve. The timeline manager may make this determination based on the space available in the timeline 220. Once the number of timeline units needed to fill the time period is known, the timeline manager will retrieve 512 timeline units for display. However, before the timeline units can be displayed, the timeline manager will determine 513 if there are any timeline units which contain narrative data that the current viewing user is not authorized to view. Viewing user authorization to view narrative data will be based on the subject user(s) privacy settings and the relationship between the viewing user and the subject user(s). If the subject user(s) has/have restricted some narrative data as "friends only" and if the viewing user is not a connection of the subject user(s), then the viewing user will not have authorization to view timeline units which contain representations of that narrative data. If the timeline manager determines that the viewing user does not have authorization to view one or more timeline units, those timeline units will be discarded 514 and replacement timeline units will be retrieved from the timeline unit store. If the viewing user has only limited viewing authorization it is possible that there will not be enough timeline units to display in the currently displayed time period display. In this situation the timeline manager may leave a portion of the time period display empty, or the timeline manager may request additional timeline units from the timeline unit generator.

Once the timeline units have been selected they may be sent directly, or they may be converted into a displayable representation, as described above, before being sent to the client device 105 of the viewing user along with other elements of the timeline interface to be displayed 515—in one embodiment the timeline interface is sent as part of the subject user(s) profile page. After this step the timeline manager may receive 516 user curation data collected from the viewing user's client device 105, for the displayed timeline units and/or the narrative data contained in them. The user curation data can consist of many types of user feedback including click-through on the narrative data, moving of the timeline units, hiding of the timeline units, marking of timeline units through "stars", "pins", "buttons", etc., and other user feedback mechanisms commonly used in user interfaces. In some embodiments user curation data is only collected from the subject user(s). In other embodiments curation data is also collected from viewing users.

Stories and Newsfeeds

Timeline units are a specific incarnation of a more general social network story aggregation. A social network story (or just "story") is an aggregation of data gathered by the social networking system 100 that is configured for display in various social networking system views. For example, stories can be presented to viewing users in a continuously updated real-time newsfeed in a web browser, or stories can be displayed in a timeline view (i.e. timeline units in the timeline interface), or stories can be displayed through a map view, etc.

The story generation process is a more generalized form of the timeline unit generation process. There are different types of story generators configured to generate stories for different purposes (i.e. different views). Story generators select narrative data and generate stories, using story templates to configure the look and behavior of the generated stories. Story generators are configured to generate stories for a particular view, and they may restrict the selection of narrative data that they use to generate stories based on this target view. For example, a story generator may be configured to generate stories for a map view of "check-ins", and based on this purpose the story generator may restrict the narrative data it uses to generate stories to the type "location check-ins". In another example, a story generator may be configured to generate stories for a photo album view, and based on this purpose it may restrict the narrative data that it uses to generate stories to narrative data that contains or references images. The timeline unit generator can be thought of as one or more special case story generators that are configured to generate stories that are suitable for a timeline view (i.e. for display on a timeline interface).

Another example of an application of the story generation process is the generation of stories for newsfeed views and historical newsfeed views. In one embodiment, a newsfeed is simply a scrollable list of the most relevant recent stories related to the viewing user that updates in real-time. A historical newsfeed is a newsfeed that is reconstructed for some time period in the past, using stories from that time period as opposed to the current time period. For newsfeeds and historical newsfeeds there may be multiple story generators of different types producing stories of different types that are displayed together in the scrollable list. Systems and methods for generating stories for a newsfeed from data captured by a social networking system are disclosed in U.S. application Ser. No. 11/503,037, filed on Aug. 11, 2006, and U.S. application Ser. No. 11/502,757, filed on Aug. 11, 2006, which are incorporated by reference in their entirety.

Figure 6:
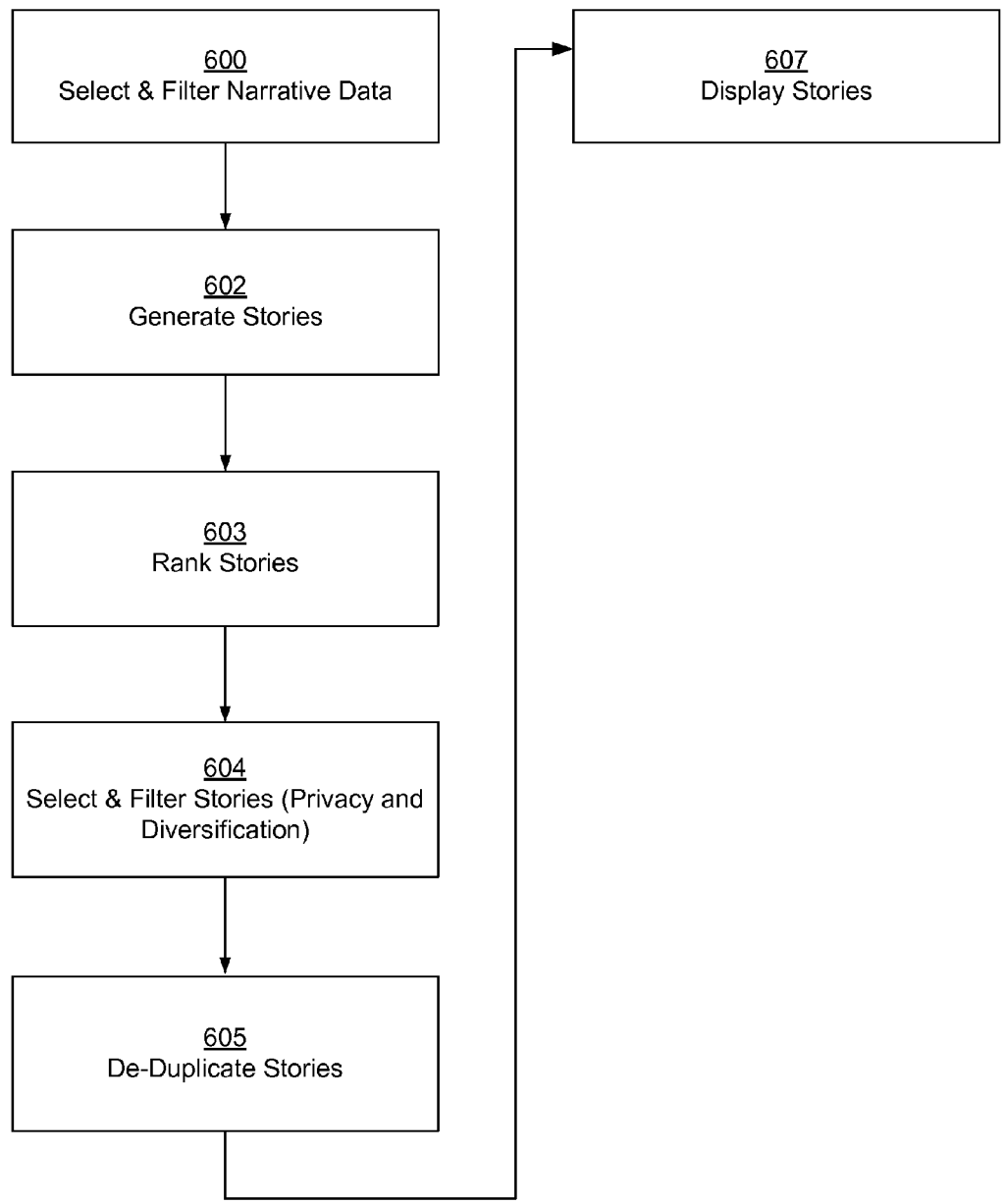
FIG. 6 illustrates one embodiment of the story generation, selection, and display process for newsfeeds and historical newsfeeds.

FIG. 6 illustrates one embodiment of the story generation, selection, and display process for newsfeeds and historical newsfeeds. One or more story generators select and filter 600 narrative data to use for story generation. For newsfeeds, the selection of narrative data can be based on the viewing user for whom the newsfeed is being generated. In one embodiment the story generators select all narrative data that is associated with the viewing user and with the viewing user's direct connections (friends, relatives, co-workers, etc.). In another embodiment the story generators may use one or more filters to select only certain narrative data that fulfill particular criteria. For example, a filter may be used to select only the most relevant narrative data by selecting only the narrative data for which the viewing user has the highest affinity scores. A ranking process may also be used to help select the most relevant narrative data. In another example, a filter may be used to eliminate all narrative data that the viewing user has viewed in the past, so that only unviewed narrative data is used in story generation. Similarly, the newsfeed can select new narrative data for story generation by using a filter that restricts the selection of narrative data to recently captured narrative data (e.g. narrative data captured in the last day, or week). A story generator may also filter narrative data based on its type. For example, an "event" story generator may select only narrative data that is associated with an event, while a photo story generator may select only narrative data that contains images. In one embodiment the story generators filter their selections of narrative data based on the privacy settings of the subject users that are associated with that narrative data. In the case where a viewing user is not given permission by a subject user to view a certain piece of narrative data, the story generators may exclude that narrative data from the story generation process. In other embodiments there is no privacy filtering at the story generation stage and privacy is enforced later in the process as described herein.

The process for selecting and filtering narrative data for story generation for a historical newsfeed is similar to that for a newsfeed except that in the case of a historical newsfeed a story generator may filter based on either the viewing user's current affinity scores for narrative data, or the viewing user's historical affinity scores from the time period for which the historical newsfeed is being generated. In addition, narrative data will be filtered to select data that is associated with the time period for which the historical newsfeed is being generated.

The story generators use the selected narrative data to generate 602 a pool of candidate stories using story templates. The story templates contain information on how the narrative data should be configured for display in the stories. The story templates may define a particular layout or arrangement of data, and may also define particular user interfaces or behaviors for the stories, based on the purpose of the stories. This is analogous to the timeline unit generation process where narrative data is arranged in different ways with different user interfaces, in timeline units of different types. Similarly, there can be stories of different types, with different user interfaces and arrangements, in newsfeeds and historical newsfeeds.

After generation, the pool of candidate stories may be stored in a database so that they can be quickly accessed for use in later stages in the process. In one embodiment, a story is stored in a database as a list of references to narrative data with additional information called the story metadata. In this embodiment the story metadata is the information that defines the look and behavior of the story when it is eventually converted into a visual representation for display on a viewing user's client device.

Each generated story in the pool of candidate stories may also be associated with a unique hash or identifier. This hash is generated based on the story generator type and the story metadata. The unique hash enables the social networking system 100 to track the stories that the viewing user has viewed or interacted with. This information can be used to adjust the viewing user's affinity scores for the referenced narrative data, and to improve the selection of narrative data and/or stories for that viewing user. In some cases, as new narrative data is captured by the social networking system 100, a story may be regenerated so that it contains some new narrative data that it did not contain before. In these cases the story's hash will remain the same, since the hash is based only on the story generator type and the story metadata, but the narrative data that is referenced will be different. This enables the social networking system 100 to continue to track stories even as the narrative data displayed in them changes over time.

After the stories are generated they may be ranked 603 to determine their relative relevance to the viewing user. The ranking of stories in the candidate pool may be based on the viewing user's affinity scores for the stories or for the narrative data that the stories reference. The ranking may also take into account the viewing user's interaction history with the stories either directly, or as reflected in the affinity scores for the referenced narrative data. The ranking may also be generated by way of a machine-learned model, in a manner analogous to the timeline unit ranking described herein. Stories generated for use in a historical newsfeed may be ranked based on either the viewing user's current affinity scores or they may be ranked based on the viewing user's historical affinity scores from the time period for which the historical newsfeed is being generated.

After the stories are ranked, the top stories from the ranking may be selected and filtered 604 based on the ranking. In the filtering step the social networking system 100 may enforce various policies in the story selection process by eliminating stories that do not meet certain criteria. For example, a privacy policy may be enforced based on the privacy settings of the subject users that are associated with the narrative data referenced in the stories. In this example all stories that contain narrative data that a viewing user does not have permission to view are eliminated from the pool of candidate stories. The filtering step may also be used to enforce a diversity policy for the stories in the newsfeed and historical newsfeed. The diversification process works in a manner analogous to the timeline unit diversification 508, in that the system will attempt to avoid a monotonous selection of stories for the newsfeed by positively biasing story types in the ranking that are poorly represented at the top of the ranking, and negatively biasing story types that are overrepresented at the top of the ranking.

The story selection process may also include a story de-duplication 605 step. The de-duplication step is analogous to the de-duplication 507 in timeline unit generation. As in timeline unit generation the system will remove duplicate narrative data from stories by either filtering out lower ranked stories that contain the duplicate narrative data entirely, or by removing just the duplicated narrative data from lower ranked stories.

In the last step the selected stories are sent to a viewing user's client device for display as part of a requested newsfeed or historical newsfeed. In one embodiment, the raw data of the story is not sent to the client device, but rather a visual representation of the story is sent instead. The visual representation may be constructed by accessing the referenced narrative data in the story and configuring a visual representation of this narrative data using the information in the story metadata.

The newsfeeds and historical newsfeeds may have variations that differ from the embodiment described above. The embodiment above describes newsfeeds and historical newsfeeds where the narrative data used is associated with either the viewing user or any of the viewing user's connections, but in another embodiment the narrative data selected may be that associated with a single subject user (who may also be the viewing user). In this embodiment the affinity scores of the subject user, instead of the viewing user, may be used to determine the relevance of the narrative data and/or stories. The timeline 220 described herein is a variation of this latter embodiment, where timeline units are a specific implementation of the generic story.

In another variation, the stories generated for a newsfeed or historical newsfeed may be presented as part of a "map view" where the stories are plotted on a map by location. This is analogous to the timeline map 280 described herein, and the map view of the stories may have an equivalent interface, with generic stories substituting for the timeline units.

Practical Concerns

In some embodiments, the modules of the social networking system 100 are not contained within a single networking system but are found across several such systems. The social networking system 100 may communicate with the other systems, for example, using APIs. In these embodiments, some modules shown in FIG. 3 may run in the social networking system 100, whereas other modules may run in the other systems. For example, in one embodiment the user data store 350 and action log 351, may run on some external networked database system outside the social networking system 100.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure. Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described. Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
    receiving a request from a viewing user of a social networking system for a timeline view presenting one or more stories in a chronological order based on a time associated with each of the one or more stories;
    identifying a story generator maintained by the social networking system and associated with the timeline view;
    accessing one or more items of narrative data maintained by the social networking system and related to the viewing user;
    filtering the narrative data based on one or more time periods based on characteristics of the story generator associated with the timeline view;
    selecting one or more items of narrative data from the filtered narrative data based on a relevance of the narrative data to the viewing user;
    generating one or more timeline units from the selected one or more items of narrative data using the story generator associated with the timeline view;
    generating an affinity score for each of the one or more timeline units, each affinity score comprises a measure of the relevance of a timeline unit to the viewing user;
    generating a ranking of the one or more timeline units based on the affinity scores;
    selecting one or more timeline units based at least in part on the ranking; and
    sending the timeline view comprising displayable representations of the selected timeline units in an order based on time periods associated with each of the selected timeline units to the client device for display to the viewing user.

2. The method of claim 1, wherein selecting one or more timeline units based at least in part on the ranking comprises:
    removing narrative data included in a timeline unit from an additional timeline unit.

3. The method of claim 1, wherein selecting one or more timeline units based at least in part on the ranking comprises:
    modifying the ranking by removing one or more timeline units from the ranking that include narrative data included in one or more additional timeline units in the ranking; and
    selecting one or more of the timeline units based on the modified ranking.

4. The method of claim 1, wherein filtering the narrative data comprises:
    removing narrative data included in a timeline unit previously viewed by the viewing user.

5. The method of claim 1, wherein filtering the narrative data comprises:
    removing narrative data that the viewing user does not have permission to view.

6. The method of claim 1, wherein filtering the narrative data comprises:
    removing narrative data having one or more types not associated with the timeline view.

7. The method of claim 1, wherein each generated timeline unit comprises story metadata and one or more references to narrative data, the story metadata describing visual presentation of a displayable representation of a timeline unit.

8. The method of claim 1, wherein selecting one or more timeline units based at least in part on the ranking comprises:
    modifying the ranking by removing timeline units from the ranking that the viewing user is not authorized to view; and
    selecting one or more timeline units based at least in part on the modified ranking.

9. The method of claim 1, wherein selecting one or more timeline units based at least in part on the ranking comprises:
    modifying a position in the ranking of a timeline unit having a type based in part on a number of timeline units having the type and having at least a threshold position in the ranking; and
    selecting one or more timeline units based at least in part on the modified ranking.

10. A method comprising:
    accessing narrative data related to a viewing user of a social networking system;
    selecting one or more items of narrative data based on a relevance of the narrative data to the viewing user;
    generating one or more timeline units from the selected one or more items of narrative data based at least in part on a time period associated with a timeline view requested by the viewing user;
    generating an affinity score for each of the generated timeline units, each affinity score comprising a measure of a relevance of a generated timeline unit to the viewing user;
    generating a ranking of the generated timeline units based on the affinity scores;
    selecting one or more of the generated timeline units based on the ranking; and
    sending displayable representations of the selected timeline units to a client device for display to the viewing user.

11. The method of claim 10, wherein selecting one or more items of narrative data based on the relevance of the narrative data to the viewing user comprises:
    identifying narrative data having a type associated with the timeline view.

12. A method comprising:
    accessing narrative data related to a subject user of a social networking system;

determining one or more story generators associated with a timeline view requested by a viewing user of a social networking system;
filtering the narrative data based on the characteristics of the one or more story generators;
determining one or more items of narrative data based on a relevance of the narrative data to the subject user;
generating one or more timeline units from determined narrative data using the one or more story generators, each timeline unit associated with a time interval;
generating an affinity score for each of the generated timeline units, each affinity score comprising a measure of the relevance of a timeline unit to the subject user;
generating a ranking of the one or more timeline units based on the affinity scores;
selecting one or more of the ranked timeline units based on the ranking; and
sending, the timeline view comprising displayable representations of the selected one or more of the ranked timeline units to a client device for display to the viewing user.

13. The method of claim 12, wherein selecting one or more of the ranked timeline units based at least in part on the ranking comprises:
removing narrative data included in a timeline unit from an additional timeline unit.

14. The method of claim 12, wherein selecting one or more of the ranked timeline units based at least in part on the ranking comprises:
modifying the ranking by removing one or more timeline units from the ranking that include narrative data included in one or more additional timeline units in the ranking; and
selecting one or more of the timeline units based on the modified ranking.

15. The method of claim 12, wherein filtering the narrative data comprises:
removing narrative data that the viewing user does not have permission to view.

16. The method of claim 12, wherein filtering the narrative data comprises:
removing narrative data having one or more types not associated with the timeline view.

17. The method of claim 12, wherein each generated timeline unit comprises story metadata and one or more references to narrative data, the story metadata describing visual presentation of a displayable representation of a timeline unit.

18. The method of claim 12, wherein selecting one or more of the ranked timeline units based at least in part on the ranking comprises:
modifying the ranking by removing timeline units from the ranking that the viewing user is not authorized to view; and
selecting one or more timeline units based at least in part on the modified ranking.

19. The method of claim 12, wherein selecting one or more of the ranked timeline units based at least in part on the ranking comprises:
modifying a position in the ranking of a timeline unit having a type based in part on a number of timeline units having the type and having at least a threshold position in the ranking; and
selecting one or more timeline units base at least in part on the modified ranking.

20. A non-transitory computer-readable storage medium storing instructions, the instructions when executed by a processor in a social networking system, causes the processor to:
receiving a request from a viewing user of a social networking system for a timeline view presenting one or more stories in a chronological order based on a time associated with each of the one or more stories;
identifying a story generator maintained by the social networking system and associated with the timeline view;
accessing one or more items of narrative data maintained by the social networking system and related to the viewing user;
filtering the narrative data based on one or more time periods based on characteristics of the story generator associated with the timeline view;
selecting one or more items of narrative data from the filtered narrative data based on a relevance of the narrative data to the viewing user;
generating one or more timeline units from the selected one or more items of narrative data using the story generator associated with the timeline view;
generating an affinity score for each of the one or more timeline units, each affinity score comprises a measure of the relevance of a timeline unit to the viewing user;
generating a ranking of the one or more timeline units based on the affinity scores;
selecting one or more timeline units based at least in part on the ranking; and
sending the timeline view comprising displayable representations of the selected timeline units in an order based on time periods associated with each of the selected timeline units to the client device for display to the viewing user.

21. The non-transitory computer-readable storage medium of claim 20, wherein selecting one or more timeline units based at least in part on the ranking comprises:
modifying the ranking by removing one or more timeline units from the ranking that include narrative data included in one or more additional timeline units in the ranking; and
selecting one or more of the timeline units based on the modified ranking.

22. The non-transitory computer-readable storage medium of claim 20, wherein filtering the narrative data comprises:
removing narrative data that the viewing user does not have permission to view.

23. The non-transitory computer-readable storage medium of claim 20, wherein filtering the narrative data comprises:
removing narrative data having one or more types not associated with the timeline view.

24. The non-transitory computer-readable storage medium of claim 20, wherein each generated timeline unit comprises story metadata and one or more references to narrative data, the story metadata describing visual presentation of a displayable representation of a timeline unit.

25. The method of claim 20, wherein selecting one or more timeline units based at least in part on the ranking comprises:
modifying the ranking by removing timeline units from the ranking that the viewing user is not authorized to view; and
selecting one or more timeline units based at least in part on the modified ranking.

* * * * *